US011820629B2

(12) United States Patent
Pedretti et al.

(10) Patent No.: US 11,820,629 B2
(45) Date of Patent: Nov. 21, 2023

(54) DAMPED SELF-CENTERING MECHANISM

(71) Applicant: Energy Vault, Inc., Pasadena, CA (US)

(72) Inventors: Andrea Pedretti, Bellinzona (CH);
Ernst Carlos Rohner, Oberkulm (CH)

(73) Assignee: Energy Vault, Inc., Westlake Village, CA (US)

( * ) Notice: Subject to any disclaimer, the term of this patent is extended or adjusted under 35 U.S.C. 154(b) by 208 days.

(21) Appl. No.: 17/153,241

(22) Filed: Jan. 20, 2021

(65) Prior Publication Data
US 2021/0221652 A1 Jul. 22, 2021

Related U.S. Application Data

(60) Provisional application No. 62/964,528, filed on Jan. 22, 2020.

(51) Int. Cl.
*B66C 1/66* (2006.01)
*B66C 1/06* (2006.01)
*F03G 3/00* (2006.01)

(52) U.S. Cl.
CPC . *B66C 1/06* (2013.01); *F03G 3/00* (2013.01)

(58) Field of Classification Search
CPC .. B66C 1/10; B66C 1/66; B66C 1/105; B66C 1/36; B66C 1/54; F03G 3/00
USPC ................. 294/82.1, 82.13, 93–97
See application file for complete search history.

(56) References Cited

U.S. PATENT DOCUMENTS

| 1,720,732 | A | | 7/1929 | Jongedyk |
| 1,822,432 | A | | 9/1931 | Bradley |
| 2,627,176 | A | | 2/1953 | Samuels |
| 2,924,484 | A | | 2/1960 | Tolsma |
| 3,405,278 | A | | 10/1968 | Ley |
| 4,018,021 | A | | 4/1977 | Dow |
| 4,237,011 | A | * | 12/1980 | Acosta ................... B01D 29/52 248/500 |
| 4,276,806 | A | * | 7/1981 | Morel ................. F16B 19/1081 411/41 |
| 4,284,899 | A | | 8/1981 | Bendiks |
| 4,381,839 | A | | 5/1983 | Engler |

(Continued)

FOREIGN PATENT DOCUMENTS

| CN | 1671929 A | 9/2005 |
| CN | 103334887 A | 10/2013 |

(Continued)

OTHER PUBLICATIONS

"A Weighting game," International Water Power & Dam Construction, Apr. 13, 2010, 8 pages.

(Continued)

*Primary Examiner* — Paul T Chin

(74) *Attorney, Agent, or Firm* — Knobbe Martens Olson & Bear LLP

(57) ABSTRACT

A grabber used, for example in the lifting and lowering of blocks, includes one or more arms with a damped self-centering mechanism at a distal end thereof. The damped self-centering mechanism dampen a contact force received thereon and facilitates a self-centering of the damped self-centering mechanism relative to a surface of, for example, a block when the grabber is moved relative to the block (e.g., when the arms are lowered through bores in the block).

15 Claims, 25 Drawing Sheets

(56) References Cited

U.S. PATENT DOCUMENTS

| | | | |
|---|---|---|---|
| 4,728,217 A * | 3/1988 | Fink | G21C 19/10 976/DIG. 251 |
| 4,918,282 A | 4/1990 | Cheek | |
| 5,340,218 A | 8/1994 | Cuthbertson | |
| 5,888,043 A | 3/1999 | Jatcko | |
| 6,282,859 B1 | 9/2001 | Van Der Heijden | |
| 6,557,316 B2 | 5/2003 | Van Der Heijden | |
| 6,866,815 B2 | 3/2005 | Gohres et al. | |
| 6,955,015 B2 | 10/2005 | Manthei | |
| 7,191,710 B2 | 3/2007 | Powell | |
| 7,561,936 B2 | 7/2009 | Matsufuji | |
| 7,712,326 B2 | 5/2010 | Jagusztyn et al. | |
| 7,743,609 B1 | 6/2010 | Brostmeyer | |
| 7,775,571 B2 | 8/2010 | Waisanen | |
| 7,836,646 B2 | 11/2010 | Matsufuji | |
| 7,886,537 B2 | 2/2011 | Jagusztyn et al. | |
| 7,973,420 B2 | 7/2011 | Scott | |
| 8,176,702 B2 | 5/2012 | Adam | |
| 8,465,071 B2 | 6/2013 | Risi | |
| 8,667,750 B2 | 3/2014 | Speer | |
| 8,674,527 B2 | 3/2014 | Fyke et al. | |
| 9,059,605 B2 | 6/2015 | Murray | |
| 9,523,201 B2 | 12/2016 | Romanenko | |
| 9,688,520 B1 | 6/2017 | Khalil | |
| 10,961,051 B1 | 3/2021 | Lindbo et al. | |
| 2002/0024225 A1 * | 2/2002 | Ostholt | B66C 1/54 294/94 |
| 2002/0197135 A1 | 12/2002 | Amtzen | |
| 2003/0009970 A1 | 1/2003 | MacDonald | |
| 2003/0019828 A1 | 1/2003 | Choi | |
| 2003/0215318 A1 | 11/2003 | Buzzoni | |
| 2004/0020145 A1 | 2/2004 | Matsufuji | |
| 2005/0252144 A1 | 11/2005 | MacDonald | |
| 2007/0000246 A1 | 1/2007 | Prastitis | |
| 2007/0186502 A1 | 8/2007 | Marsh | |
| 2007/0193183 A1 | 8/2007 | Price | |
| 2008/0098687 A1 | 5/2008 | Marsh | |
| 2008/0149339 A1 * | 6/2008 | Krueger, V | E21B 23/01 166/301 |
| 2009/0077920 A1 | 3/2009 | Korman | |
| 2009/0173027 A1 | 7/2009 | Bennett | |
| 2009/0193808 A1 | 8/2009 | Fiske | |
| 2009/0200814 A1 | 8/2009 | Hellgren | |
| 2009/0231123 A1 | 9/2009 | Rowell et al. | |
| 2009/0284021 A1 | 11/2009 | Scott | |
| 2010/0283263 A1 | 11/2010 | Schilling | |
| 2010/0301616 A1 | 12/2010 | Al-Khamis | |
| 2011/0027107 A1 | 2/2011 | Bekken | |
| 2011/0050158 A1 | 3/2011 | MacDonald et al. | |
| 2011/0112731 A1 | 5/2011 | Harada | |
| 2011/0123257 A1 | 5/2011 | Mills | |
| 2011/0241356 A1 | 10/2011 | Khoshnevis | |
| 2012/0306223 A1 | 12/2012 | Karlsson | |
| 2013/0125540 A1 | 5/2013 | Vainonen | |
| 2014/0271240 A1 | 9/2014 | Daily | |
| 2015/0048622 A1 | 2/2015 | Schegerin | |
| 2015/0130191 A1 | 5/2015 | Houvener | |
| 2015/0285037 A1 | 10/2015 | Sadiq | |
| 2016/0032586 A1 | 2/2016 | Radford | |
| 2017/0030069 A1 | 2/2017 | Radford | |
| 2017/0288457 A1 | 10/2017 | Peitzke et al. | |
| 2020/0025181 A1 | 1/2020 | Pedretti et al. | |
| 2020/0028379 A1 | 1/2020 | Pedretti | |
| 2020/0109703 A1 | 4/2020 | Bhargava | |
| 2021/0188549 A1 | 6/2021 | Fjeldheim et al. | |
| 2021/0214199 A1 | 7/2021 | Austrheim | |
| 2021/0221618 A1 | 7/2021 | Austrheim | |
| 2021/0387769 A1 | 12/2021 | Austrheim et al. | |
| 2022/0002076 A1 | 1/2022 | Austrheim | |
| 2022/0002077 A1 | 1/2022 | Austrheim et al. | |
| 2022/0041372 A1 | 2/2022 | Austrheim | |
| 2022/0073279 A1 | 3/2022 | Austrheim et al. | |
| 2022/0097967 A1 | 3/2022 | Austrheim | |
| 2022/0161662 A1 | 5/2022 | Fjeldheim | |

FOREIGN PATENT DOCUMENTS

| | | |
|---|---|---|
| CN | 103867408 A | 6/2014 |
| CN | 111 692 055 A | 9/2020 |
| CN | 113 460 841 A | 10/2021 |
| DE | 12 79 906 | 10/1968 |
| DE | 100 37 678 A1 | 2/2002 |
| DE | 10 2010 014342 A1 | 10/2011 |
| DE | 10 2011 119116 A1 | 5/2013 |
| DE | 20 2012 102937 | 11/2013 |
| EA | 27072 B1 | 6/2017 |
| FR | 1 135 656 | 5/1957 |
| FR | 2 146 481 A1 | 3/1973 |
| FR | 2 812 865 A1 | 2/2002 |
| GB | 2351066 A | 12/2000 |
| GB | 2578805 A | 5/2020 |
| GB | 2585124 A | 12/2020 |
| JP | S648197 A | 1/1989 |
| JP | H05-233923 | 9/1993 |
| JP | 06-193553 | 7/1994 |
| JP | 2001-163574 A | 6/2001 |
| JP | 2006 022529 A | 1/2006 |
| JP | 2009-242088 | 10/2009 |
| KR | 10-0570880 B1 | 4/2006 |
| KR | 10-2009-0110891 A | 10/2009 |
| SU | 481528 A1 | 8/1975 |
| WO | WO 2013/005056 A1 | 1/2013 |
| WO | WO 2018/184868 A2 | 10/2018 |
| WO | WO 2020/040717 A1 | 2/2020 |
| WO | WO 2022/006584 A1 | 1/2022 |

OTHER PUBLICATIONS

Wood, Bruce; "Hanging Tomato Plants"; Mar. 4, 2009; retrieved May 9, 2013 using Internet Archive to view rubberingot.com.

PCT International Search Report & Written Opinion, regarding International Appl. No. PCT//US2021/014122, dated May 11, 2021, 15 pages.

* cited by examiner ly, many of these renewable energy sources (e.g., solar power, wind power) are intermittent an unpredictable, limiting the amount of electricity that can be delivered to the grid from intermittent renewable energy sources.

SUMMARY

Energy storage systems can utilize the movement of blocks to store energy and generate electricity. One or more blocks can be lifted and/or lowered using a grabber (e.g., grabber mechanism). The grabber can have one or more arms that releasably engage at least a portion of a block.

In one implementation, the one or more arms can have retractable levers movable (e.g., to an extended position) to engage one or more surfaces or edges of the block to allow lifting of the block with the grabber mechanism. In one implementation, the one or more arms can extend through a bore or opening in a block and engage a surface or edge (e.g., a bottom surface, a bottom edge, such as a boundary of the bore), requiring the one or more arms (e.g., a distal end of the arm(s)) to align with the bore(s) or opening(s) of the block to facilitate or aid in the passing of the arm(s) through the bore(s) or opening(s) of the block.

In accordance with one aspect of the invention, a grabber is provided having one or more arms configured to pass through corresponding one or more bores or openings in a block. A distal portion of the grabber comprises a damped mechanism that facilitates the self-centering of the one or more arms relative to the corresponding one or more bores or openings in the block when the arms are extended through the bores.

In accordance with one aspect of the invention, a grabber is provided having one or more arms configured to pass through corresponding one or more bores or openings in a block. A distal portion of the grabber comprises a damped mechanism that facilitates the self-centering of the one or more arms relative to the corresponding one or more bores or openings in the block when the arms are extended through the bores. The damped mechanism comprises one or more leaf springs distributed about at least a portion of the circumference of the distal portion of the grabber, the one or more leaf springs configured to resiliently deflect when contacting a surface or edge of the block.

In accordance with one aspect of the invention, a grabber is provided having one or more arms configured to pass through corresponding one or more bores or openings in a block. A distal portion of the grabber comprises a damped mechanism that facilitates the self-centering of the one or more arms relative to the corresponding one or more bores or openings in the block when the arms are extended through the bores. The damped mechanism comprises one or more levers distributed about at least a portion of the circumference of the distal portion of the grabber, the one or more levers being resiliently coupled to the distal portion and configured to resiliently deflect when contacting a surface or edge of the block.

In accordance with one aspect of the disclosure, a grabber for use in lifting and lowering blocks is provided. The grabber comprises one or more arms extending from a proximal end toward a distal end. The grabber also comprises a damped self-centering mechanism at a distal portion of the one or more arms configured to dampen a contact force received thereon and to facilitate a self-centering of the damped self-centering mechanism relative to a surface of a block when the grabber is moved relative to the block.

In accordance with another aspect of the disclosure, a grabber for use in lifting and lowering blocks is provided. The grabber comprises one or more arms extending from a proximal end toward a distal end. The grabber also comprises damped means for self-centering a distal portion of the one or more arms and for dampening a contact force received thereon from a surface of a block.

DETAILED DESCRIPTION

Figure 1:
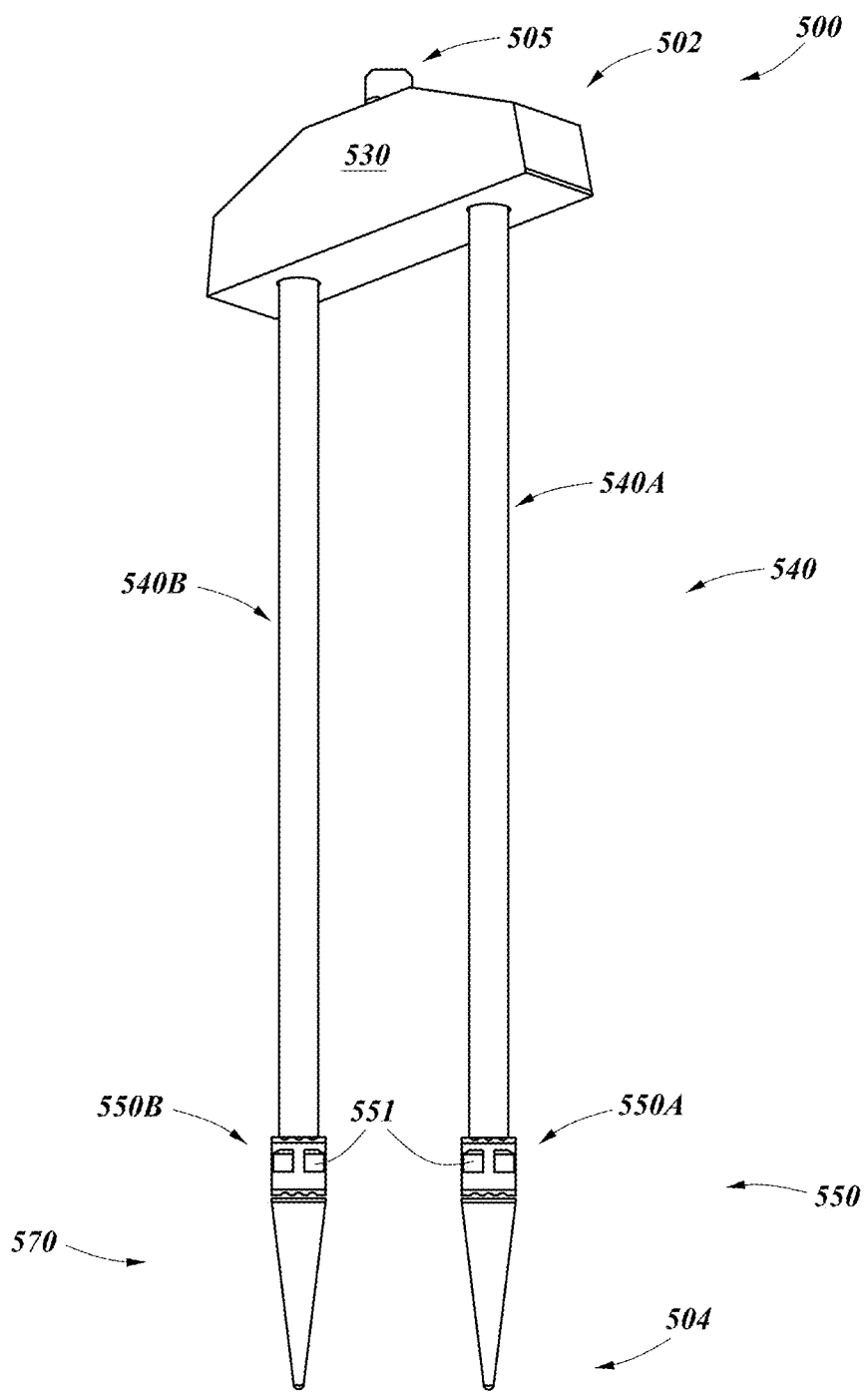
FIG. 1 is a perspective bottom view of a grabber for lifting and lowering blocks.
Figure 2:
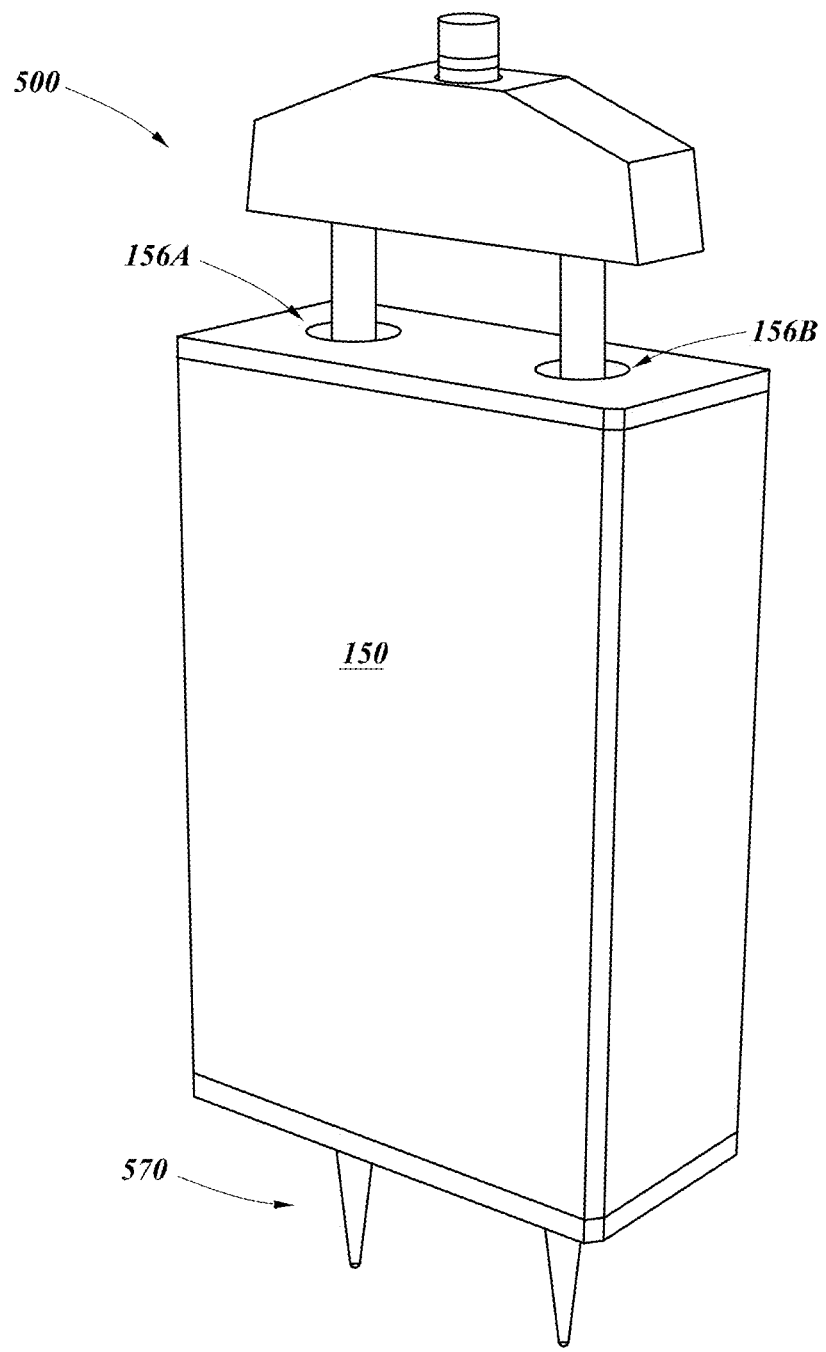
FIG. 2 is a perspective top view of the grabber in FIG. 1 coupled to a block.

FIGS. 1-2 show an example gripper or grabber mechanism 500 (the "gripper" or "grabber") operable to releasably grip or grab a block 150 (e.g., one at a time), with FIG. 2 showing the grabber 500 coupled to a block 150. The grabber 500 extends from a proximal end 502 to a distal end 504. The grabber 500 optionally includes a proximal connector 505 (e.g., that can operatively connect to a cable of a hoist). The grabber 500 also includes a cross-member 530 attached (e.g., rotatably coupled) to the connector 505. The grabber 500 also includes one or more arms 540 (e.g., a pair of arms 540), one or more locking mechanisms 550, and one or more self-centering ends 570. The one or more locking mechanisms 550 can be retractable levers that can be extended to protrude from an outer surface of the arm(s) 540 and can engage an underside of a block 150 to couple the grabber 500 to the block 150, allowing the grabber 500 to lift the block 150. Optionally, the self-centering ends 570 can be made of metal and have a tapered (e.g., conical) shape. The arms 540 and self-centering ends 570 can together have a spear-like shape that allow the self-centering ends 570 and arms 540 to pass through openings 156A, 156B in the top of the block 150.

The grabber 550 can be operated to stack blocks 150 on top of each other (e.g., to store energy as potential energy based on the vertical location of the block 150). The blocks 150 can be stacked so that openings 156A, 156B in vertically adjacent blocks align with each other. However, in some instances (e.g., due to wind force, misalignment of blocks), the openings 156A, 156B of a block 150 being lowered by the grabber 500 may not be aligned with the openings 156A, 156B of the block 150 below it onto which it is being lowered. The self-centering ends 570 operate to center the top block 150 onto a bottom block 150 as it is lowered thereon. However, due to the mass of the grabber 500 and block 150 it is coupled to, and the mass of the block 150 onto which it is being lowered, having a rigid or solid self-centering mechanism (e.g., a cone shaped distal piece), may cause forces to be effected onto the self-centering mechanism and arms 540 that may cause the arms 540 to bend, making it difficult to remove the arms 540 from the block 150 and/or reinsert the arms 540 into another block 150. Accordingly, there is a need for damped self-centering mechanisms that can self-center an upper block onto a lower block as the upper block is lowered thereon, while reducing the amount of force that can be transferred to the grabber 500 (e.g., to the arms 540 of the grabber) due to any misalignment between the blocks.

FIGS. 3-10 show different embodiments of a damped self-centering mechanism 570A-570H that include one or more springs or levers that are damped and can dampen forces applied thereto by the inner surface of the openings or bores 156A, 156B (of the block 150), for example, as the upper block 150 is lowered on the lower block 150. Though FIGS. 3-10 only show one self-centering mechanism 570A-570H, one of skill in the art will recognize that the grabber 500 can have more than one arm 540, each having the self-centering mechanism 570A-570H. Each of the damped self-centering mechanisms 570A-570H describe below can be incorporated into a distal portion of the arm(s) 540 of the grabber 500 (e.g., instead of the self-centering end 570 in FIG. 1). In other implementations, the damped self-centering mechanisms 570A-570H can be implemented in other mechanisms, other than a grabber for lifting and lowering blocks.

Figure 3:
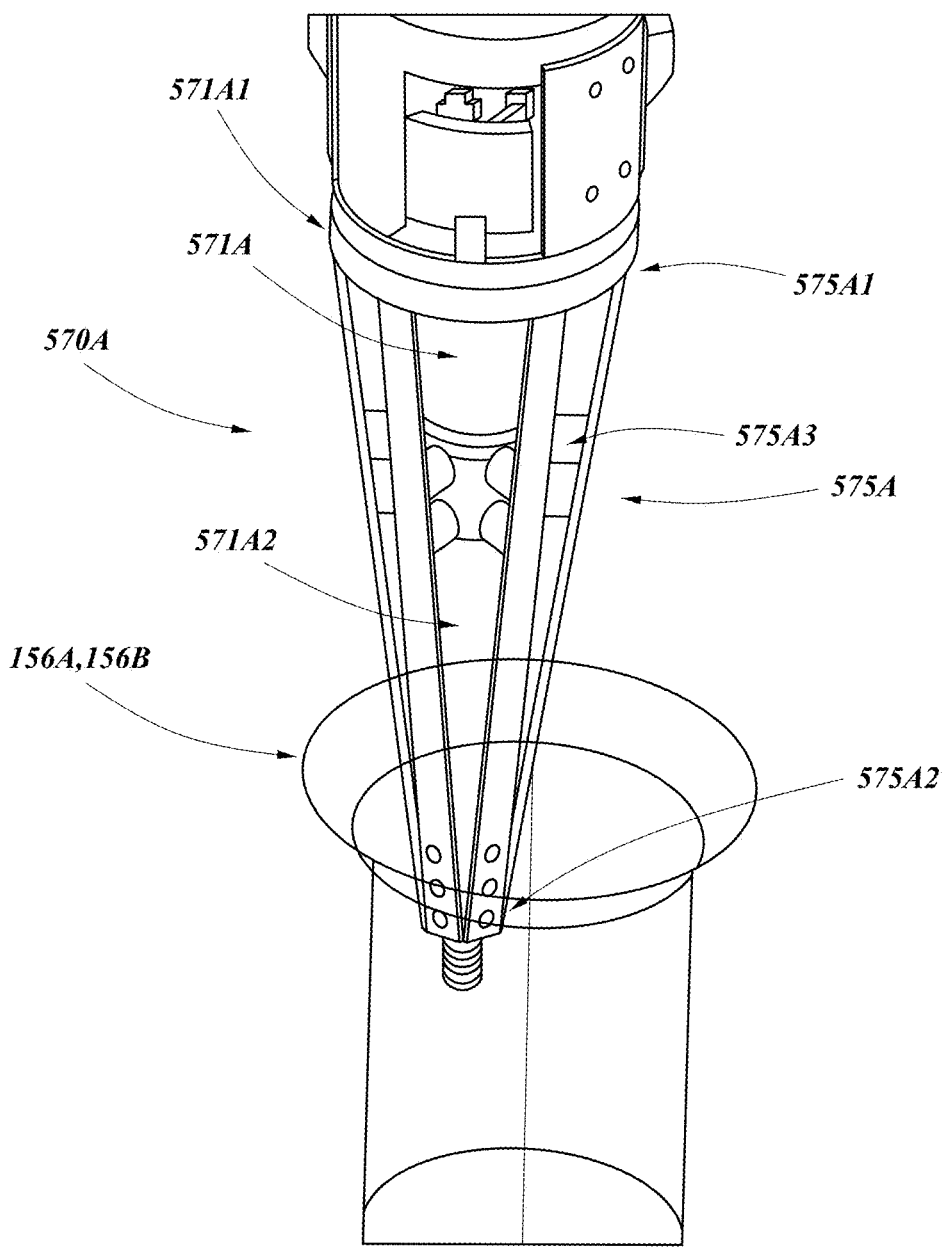
FIG. 3 is a perspective view of one embodiment of a damped self-centering mechanism.

FIG. 3 shows a damped self-centering mechanism 570A with one or more damped springs (e.g., leaf springs) 575A. The one or more springs 575A can be arranged about the circumference of a support structure or member 571A (e.g., plurality of springs 575A spaced apart from each other circumferentially about the support structure 571A). The support structure 571A can have a flange 571A1 (e.g., circular flange or disc) and a linear post 571A2 that extends distally from the flange 571A1. The one or more springs 575A can extend between a proximal end 575A1 and a distal end 575A2. The proximal end 575A1 and the distal end 575A2 can be fixed to the support structure 571A. For example, the proximal end 575A1 can be fixed to the flange 571A1 and the distal end 575A2 can be fixed to the linear post 571A2. Optionally, one or more resilient members 575A3 (e.g., bumpers made of resilient material, such as rubber) can be disposed between the linear post 571A2 and the one or more springs 575A. The one or more springs 575A can deflect (e.g., independently of each other) when they contact the inner surface of the openings 156A, 156B (e.g., to absorb at least a portion of the contact force between the self-centering mechanism 570A and, for example, the openings or bores 156A, 156B). Optionally, the one or more springs 575A are linear. Optionally, the one or more springs 575A define a generally conical shape (e.g., extend at an acute angle relative to the support structure 571A), where the distal end 575A2 of the spring 575A is radially closer to the linear post 571A2 and the proximal end 575A1 of the spring 575A is radially farther from the linear post 571A2.

FIGS. 4-8H show a damped self-centering mechanism 570B-570F with damped cantilevered springs or levers 575B-575F. The cantilevered springs or levers 575B-575F can deflect or move independently of each other, depending on which comes in contact with, for example, the inner surface of the openings or bores 156A, 156B in the block 150 (see FIGS. 8C-8H, showing how the self-centering mechanism 570F moves through the openings 156A, 156B, for example, as the arms 540 of the grabber 500 are lowered through the openings 156A, 156B).

Figure 4:
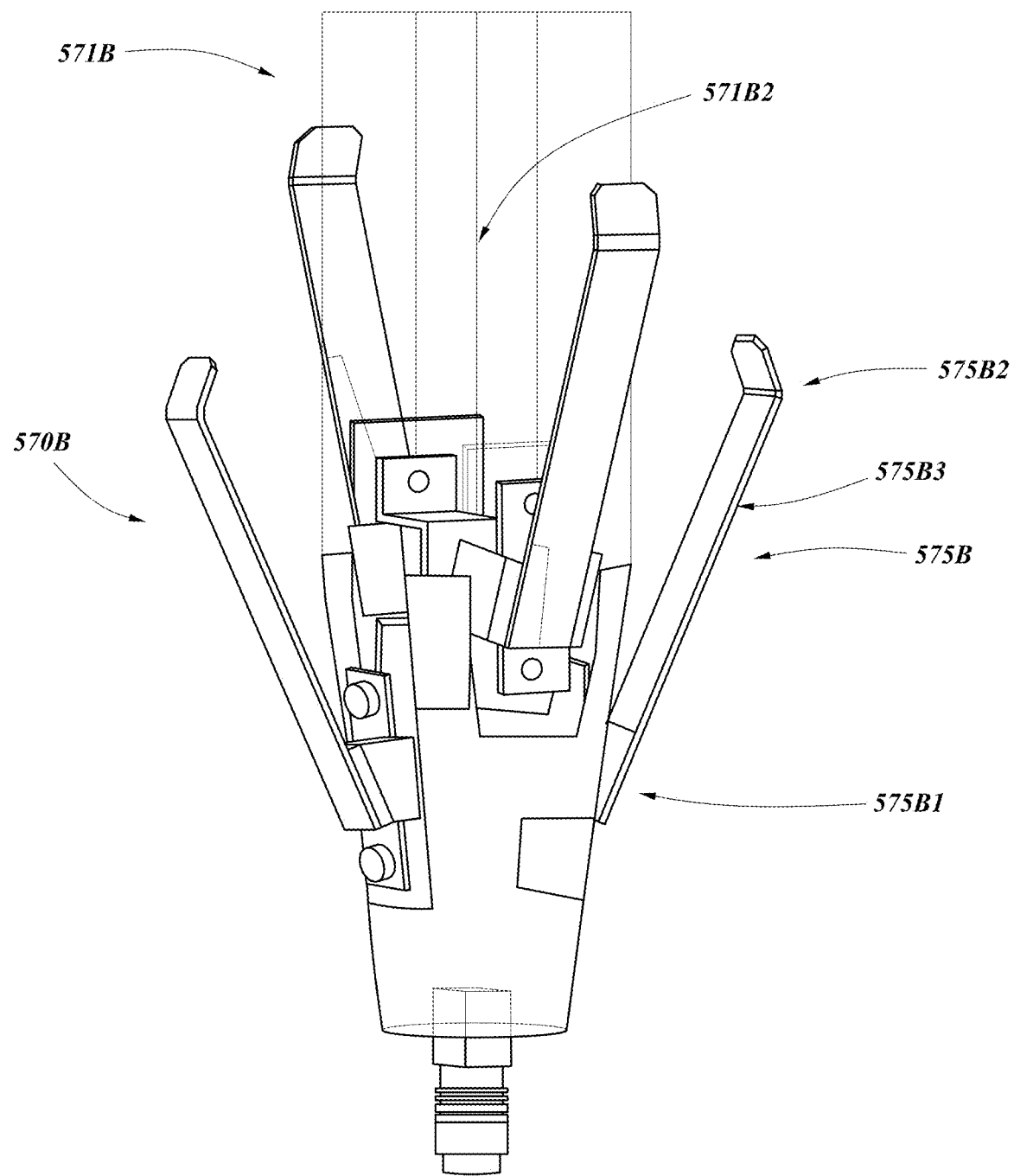
FIG. 4 is a perspective view of another embodiment of a damped self-centering mechanism.
Figure 5:
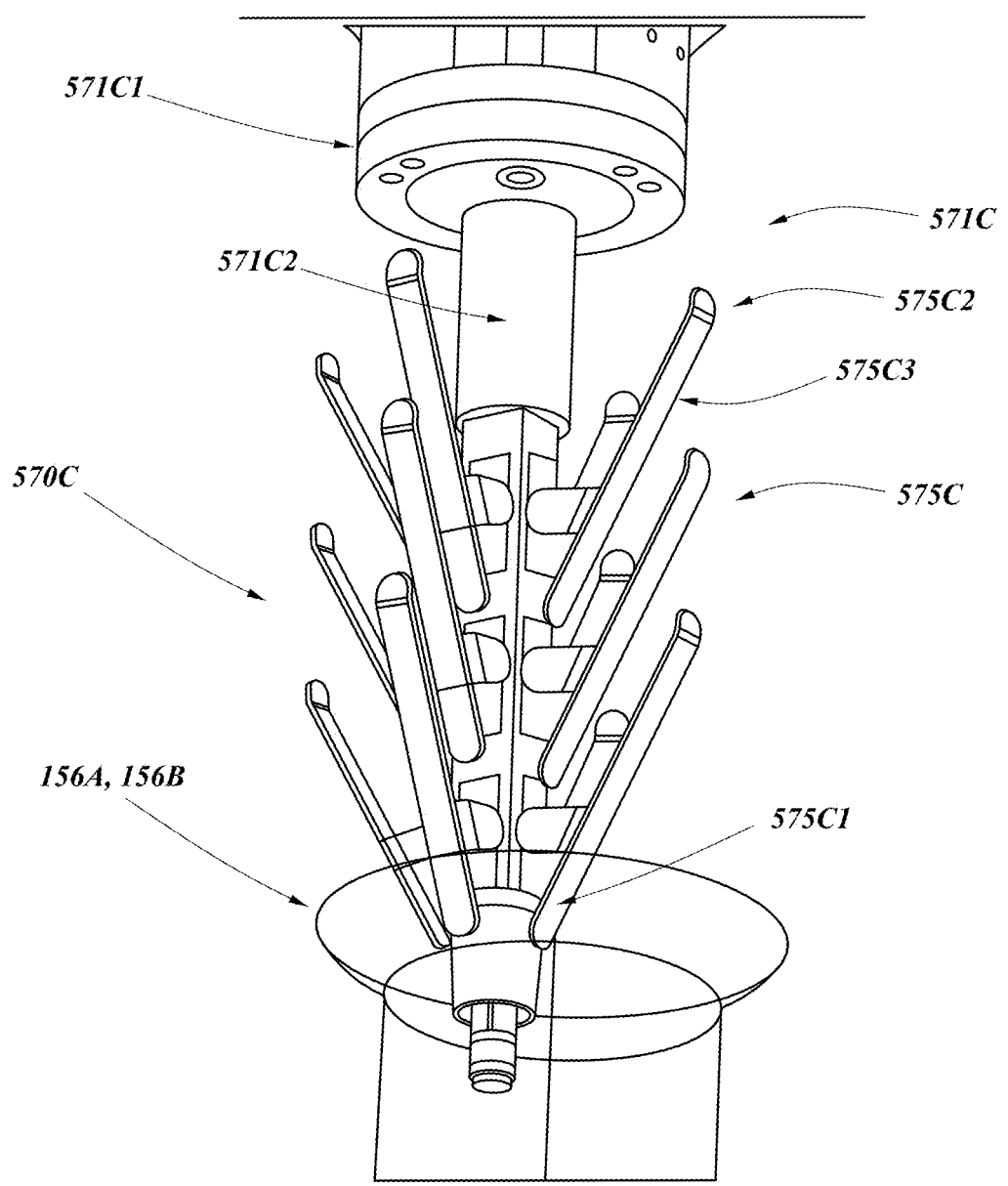
FIG. 5 is a perspective view of another embodiment of a damped self-centering mechanism.
Figure 6:
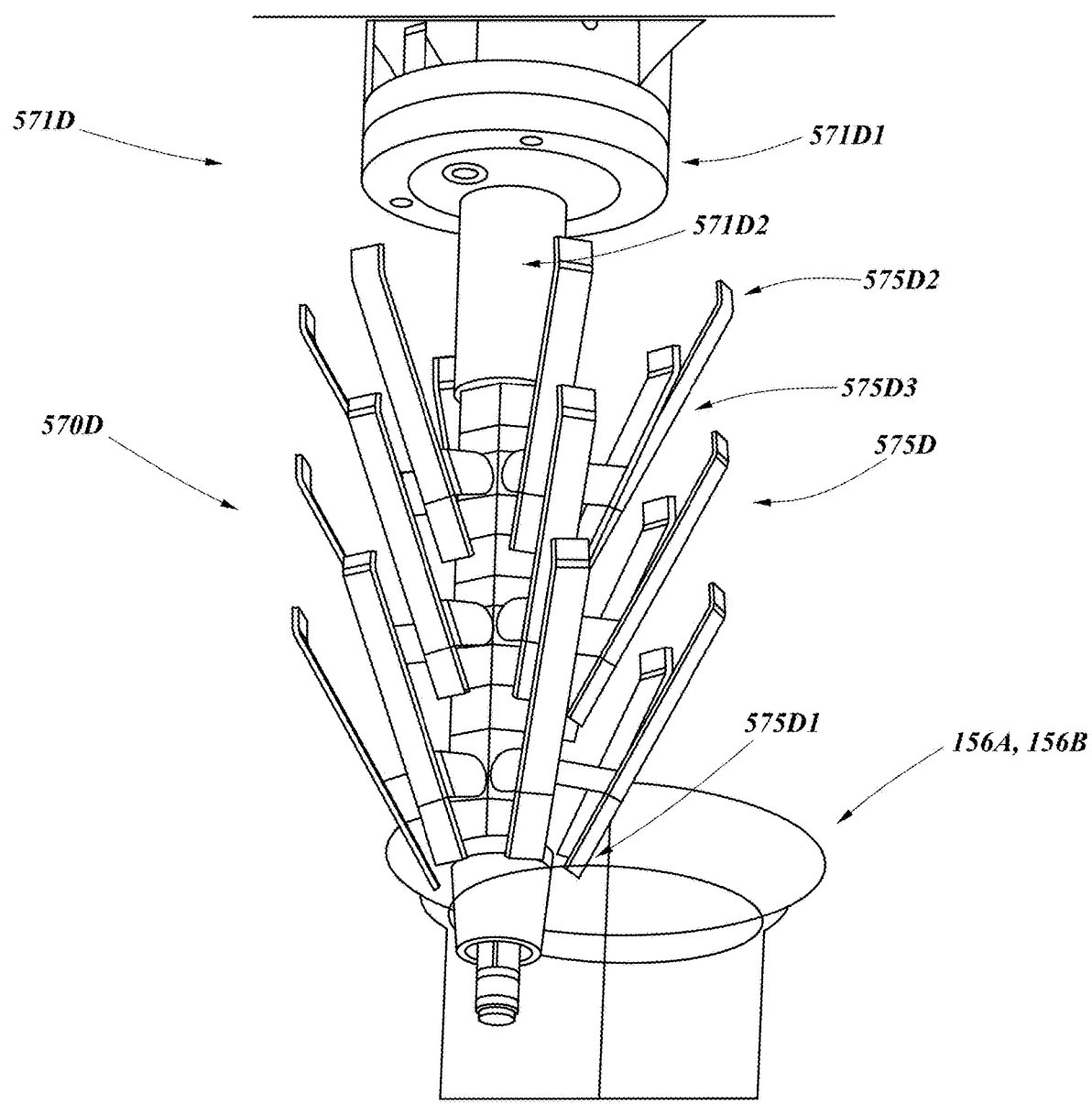
FIG. 6 is a perspective view of another embodiment of a damped self-centering mechanism.

FIGS. 4-6 show the damped self-centering mechanism 570B, 570C, 570D, respectively, with one or more damped cantilevered springs 575B, 575C, 575D. The one or more springs 575B, 575C, 575D can be arranged about the circumference of a support structure or member 571B, 571C, 571D (e.g., plurality of cantilevered springs 575B, 575C, 575D spaced apart from each other circumferentially about the support structure 571B, 571C, 571D and/or spaced apart from each other linearly along length of support structure 571B, 571C, 571D). The support structure 571B, 571C, 571D can optionally have a flange 571C1, 571D1 (e.g., circular flange or disc) and a linear post 571B2, 571C2, 571D2 that extends distally from the flange 571C1, 571D1. The one or more cantilevered springs 575B, 575C, 575D can extend between a distal (e.g., fixed) end 575B1, 575C1, 575D1 and a proximal (e.g., free) end 575B2, 575C2, 575D2. The body 575B3, 575C3, 575D3 of the cantilevered springs 575B, 575C, 575D can flex, for example, when contacted by a surface, such as the inner surface of the openings or bores 156A, 156B (e.g., to absorb at least a portion of the contact force between the self-centering mechanism 570B, 570C, 570D and, for example, the openings or bores 156A, 156B). The distal end 575B1, 575C1, 575D1 of each spring 575B, 575C, 575D can be fixed to the support structure 571B, 571C, 571D. For example, the distal end 575B1, 575C1, 575D1 can be fixed to (e.g., indirectly fixed to, operatively fixed to) the linear post 571B2, 571C2, 571C2. Optionally, one or more resilient members (e.g., bumpers made of resilient material, such as rubber) can be disposed between the linear post 571B2, 571C2, 571D2 and the distal end 575B1, 575C1, 575D1 of the one or more springs 575B, 575C, 575D. The one or more springs 575B, 575C, 575D (e.g., plurality of springs) can deflect independently of each other. Optionally, the body 575B3, 575C3, 575D3 of the one or more springs 575B, 575C, 575D are linear. Optionally, the one or more springs 575B, 575C, 575D extend at an angle (e.g., acute angle) relative to an axis of the linear post 571B2, 571C2, 571D2. In one implementation, all of the one or more springs 575B, 575C, 575D extends at substantially the same angle (e.g., acute angle) relative to the support structure 571B, 571C, 571D. For example, the distal end 575B1, 575C1, 571D1 of the spring(s) 575B, 575C, 575D is radially closer to the linear post 571B2, 571C2, 571D2 and the proximal end 575B2, 575C2, 575D2 of the spring(s) 575B, 575C, 575D is radially farther from the linear post 571B2, 571C2, 571D2.

Figure 7:
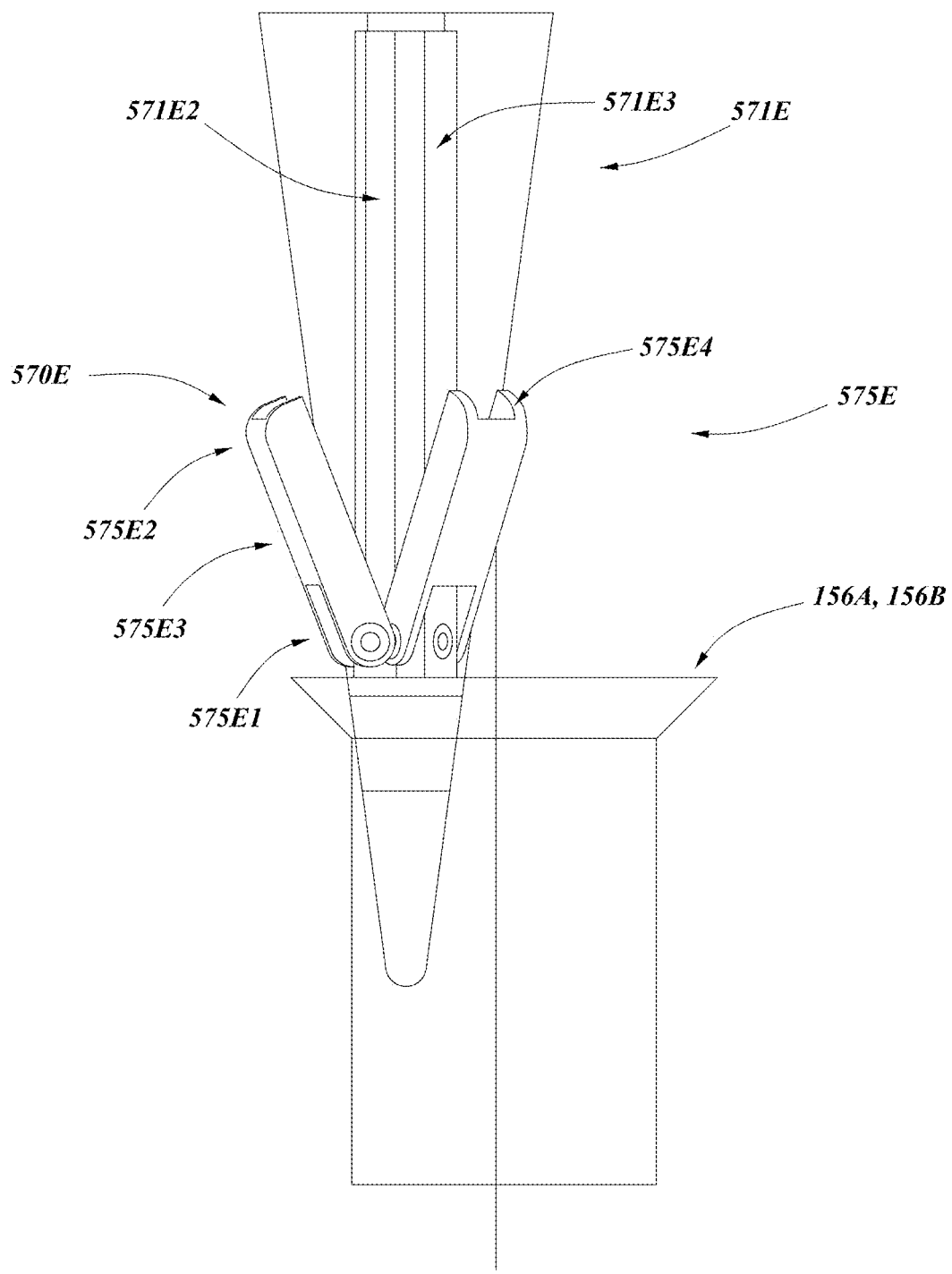
FIG. 7 is a perspective view of another embodiment of a damped self-centering mechanism.
Figure 8:
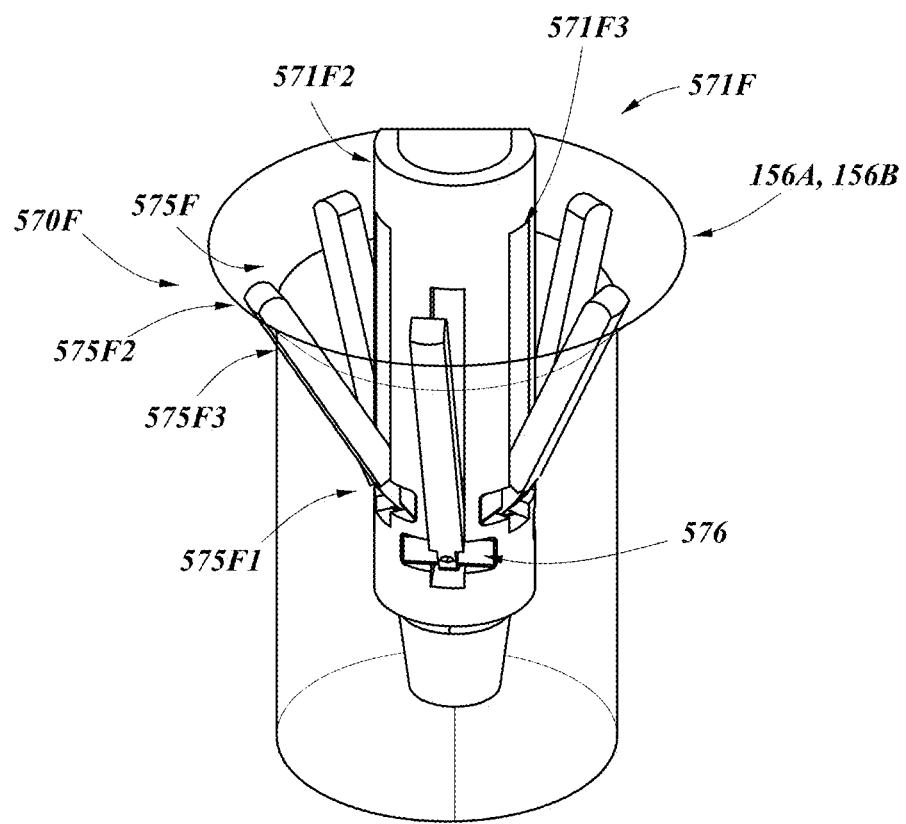
FIG. 8 is a perspective view of another embodiment of a damped self-centering mechanism.
Figure 8A:
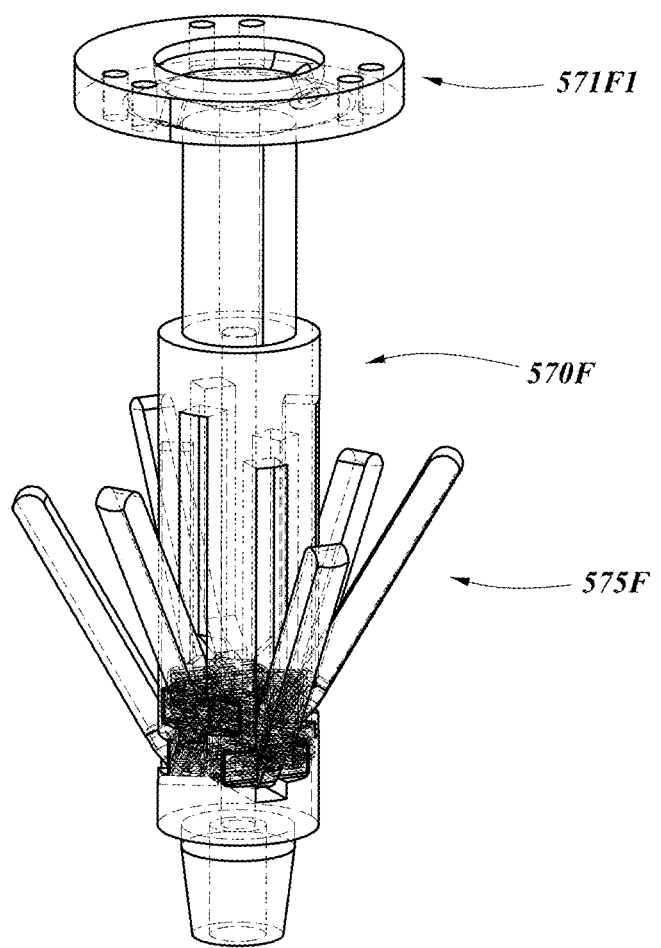
FIG. 8A is another perspective view of the damped self-centering mechanism in FIG. 8.
Figure 8B:
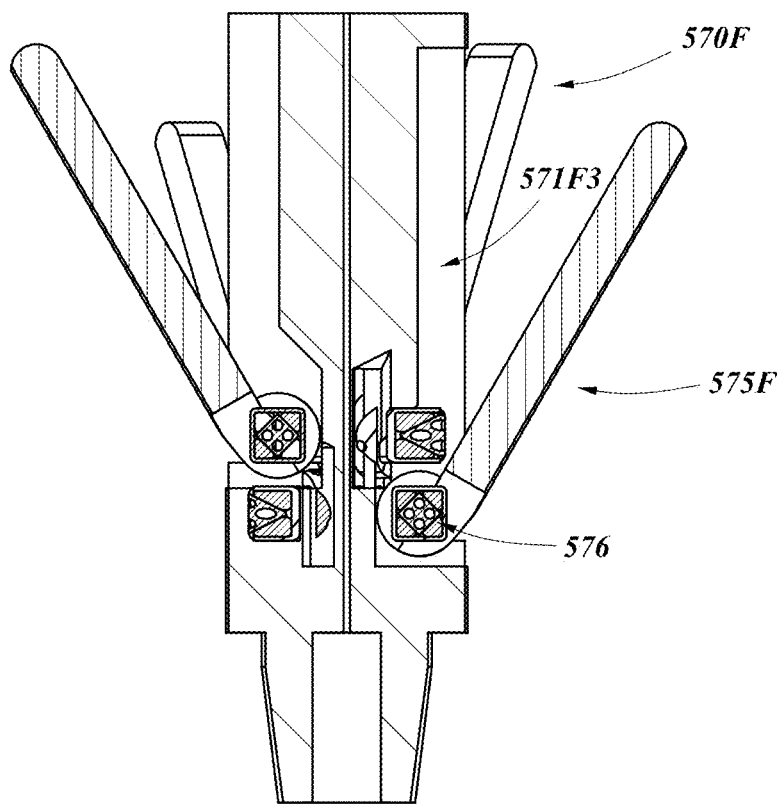
FIG. 8B is a cross-sectional view of the damped self-centering mechanism in FIG. 8.
Figure 8C:
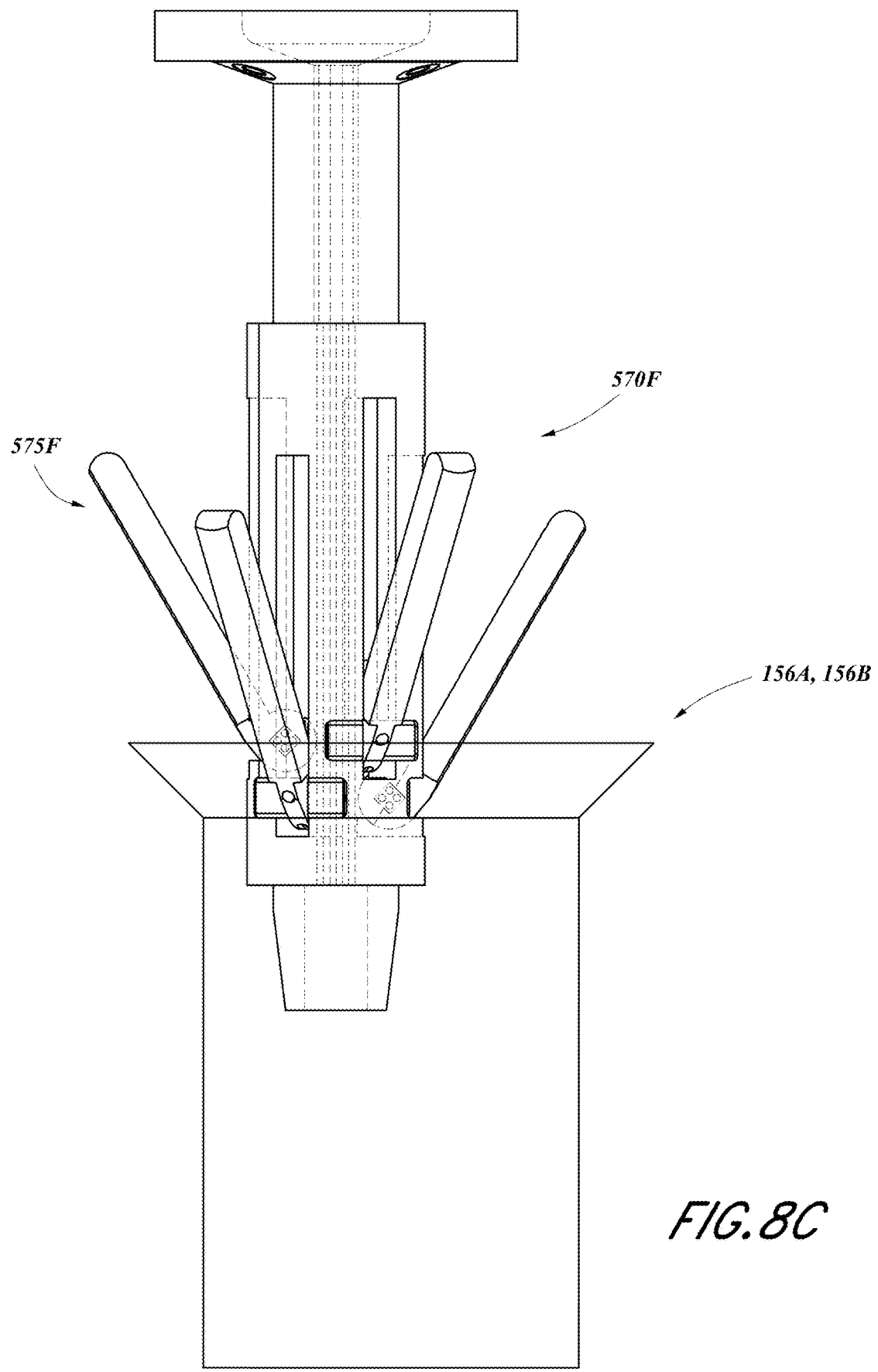
FIG. 8C is another perspective view of the damped self-centering mechanism in FIG. 8 in one position relative to an opening in a block.
Figure 8D:
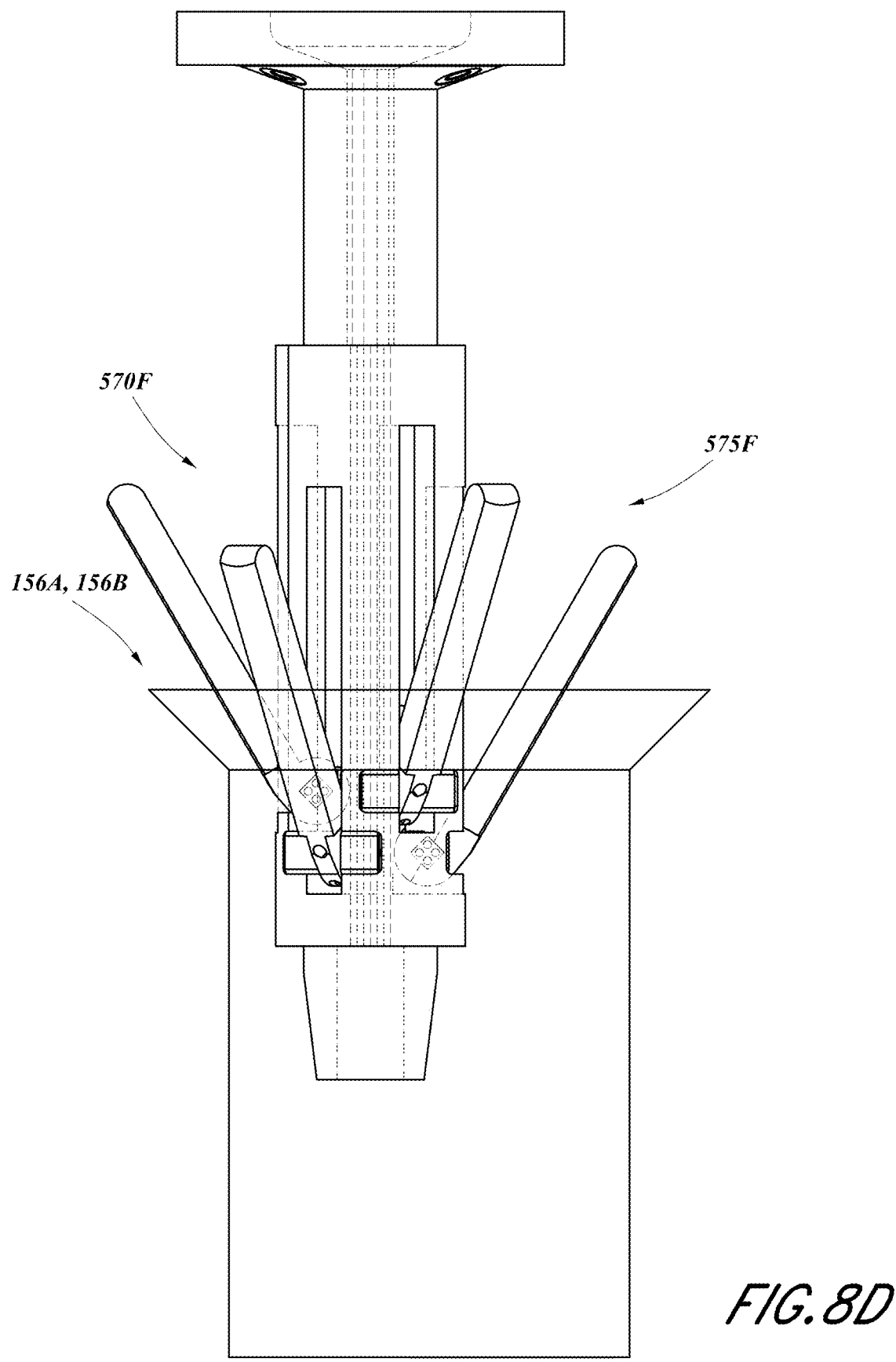
FIG. 8D is another perspective view of the damped self-centering mechanism in FIG. 8 in another position relative to an opening in a block.
Figure 8E:
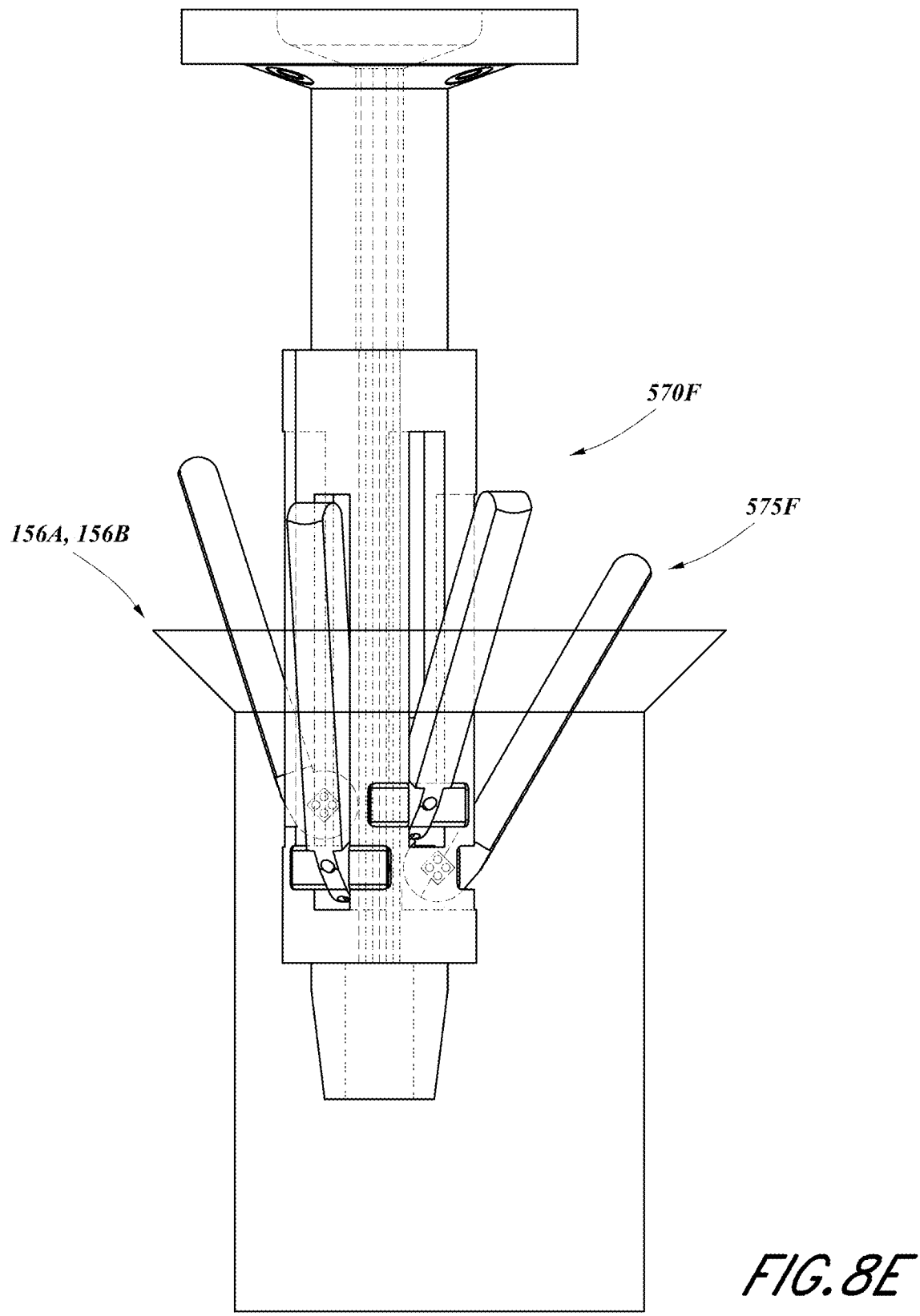
FIG. 8E is another perspective view of the damped self-centering mechanism in FIG. 8 in another position relative to an opening in a block.
Figure 8F:
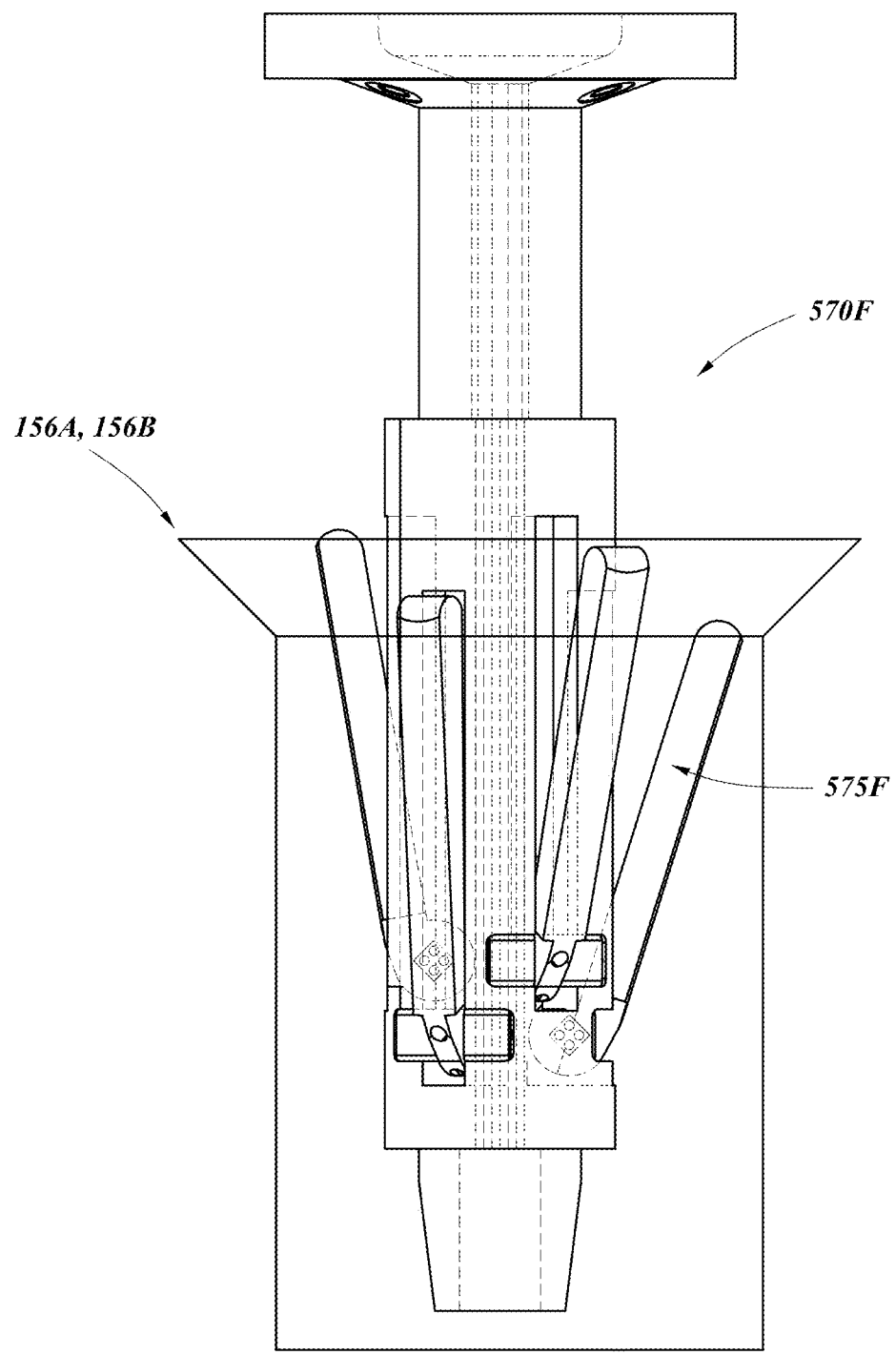
FIG. 8F is another perspective view of the damped self-centering mechanism in FIG. 8 in another position relative to an opening in a block.
Figure 8G:
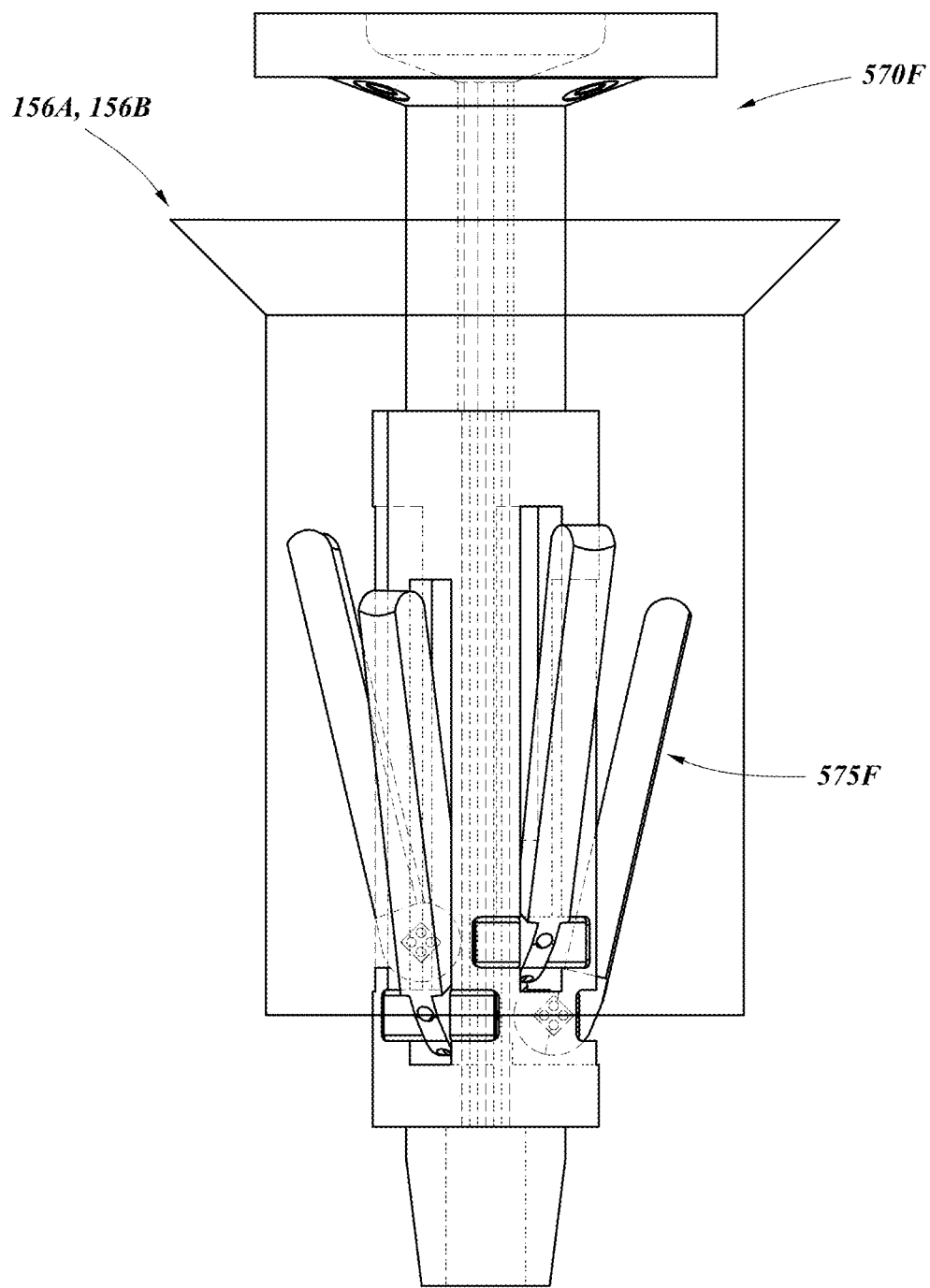
FIG. 8G is another perspective view of the damped self-centering mechanism in FIG. 8 in another position relative to an opening in a block.
Figure 8H:
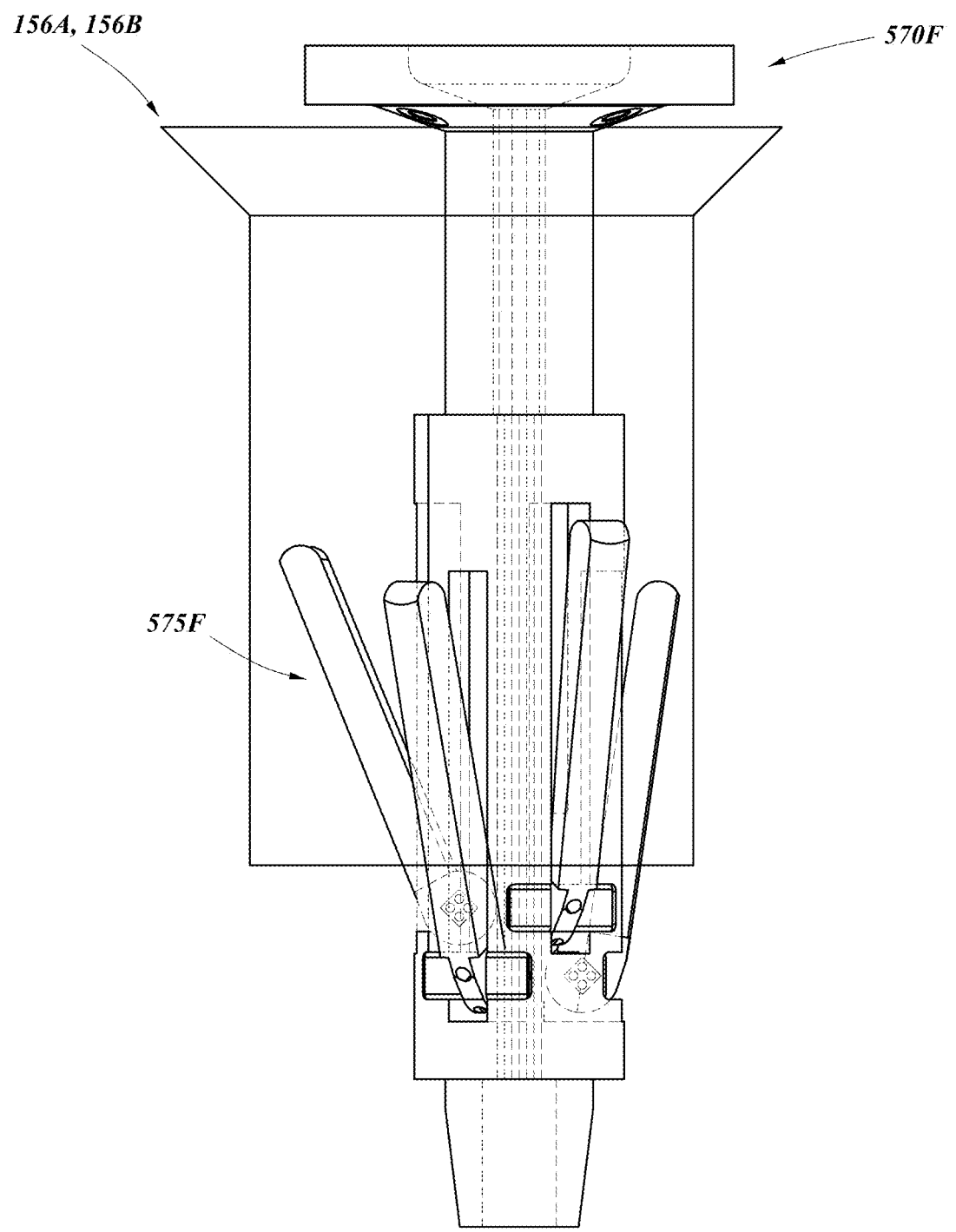
FIG. 8H is another perspective view of the damped self-centering mechanism in FIG. 8 in another position relative to an opening in a block.

FIG. 7 shows the damped self-centering mechanism 570E with one or more damped levers 575E. The one or more levers 575E can be arranged about the circumference of a support structure or member 571E (e.g., plurality of levers 575E spaced apart from each other circumferentially about the support structure 571E and/or spaced apart from each other linearly along length of support structure 571E). The one or more levers 575E can be pivotally coupled to the support structure 575E (e.g., pivotally coupled to a linear post 571E2 of the support structure 575E at the distal end of the lever 575E). The one or more levers 575E can extend between a distal (e.g., pivotally coupled) end 575E1 and a proximal (e.g., free) end 575E2. The body 575E3 of the lever(s) 575E can move (e.g., pivot about the distal end 575E1), for example, when contacted by a surface, such as the inner surface of the openings or bores 156A, 156B (e.g., to absorb at least a portion of the contact force between the self-centering mechanism 570E and, for example, the openings or bores 156A, 156B). Optionally, the one or more levers 575E are resiliently coupled to the linear post 571E2. For example, the one or more levers 575E can be spring loaded (e.g., via one or more coil springs, such as a torsion coil spring) relative to the linear post 571E2, for example, about the pivoting axis of the one or more levers 575E (e.g., pivoting axis through the coupling location of the distal end 575E1 to the linear post 571E2). The one or more levers 575E (e.g., plurality of levers) can move independently of each other. Optionally, the body 575E3 of the one or more levers 575E is linear. Optionally, the body 575E3 of the lever(s) 575E has a channel 575E4 (e.g., on a rear side of the body 575E3) that can receive at least a portion of a linear protrusion 571E3 of the linear post 571E2 (e.g., the linear post 571E2 can have a cross-shaped cross-sectional shape perpendicular to its axis, the extensions of the cross-shape defining the linear protrusions 571E3). Optionally, the one or more levers 575E extend at an angle (e.g., acute angle) relative to an axis of the linear post 571E2. In one implementation, all of the one or more levers 575E extend at substantially the same angle (e.g., acute angle) relative to the support structure 571E. For example, the distal end 575E1 of the lever(s) 575E is radially closer to the linear post 571E2 and the proximal end 575E2 of the lever(s) 575E is radially farther from the linear post 571E2.

FIGS. 8A-8H shows the damped self-centering mechanism 570F with one or more damped levers 575F. The one or more levers 575F can be arranged about the circumference of a support structure or member 571F (e.g., plurality of levers 575F spaced apart from each other circumferentially about the support structure 571F and/or spaced apart from each other linearly along length of support structure 571F). The one or more levers 575F can be pivotally coupled to the support structure 571F (e.g., pivotally coupled to a linear post 571F2 of the support structure 571F at the distal end of the lever 575F). The one or more levers 575F can extend between a distal (e.g., pivotally coupled) end 575F1 and a proximal (e.g., free) end 575F2. The body 575F3 of the lever(s) 575F can move (e.g., pivot about the distal end 575F1), for example, when contacted by a surface, such as the inner surface of the openings or bores 156A, 156B (e.g., to absorb at least a portion of the contact force between the self-centering mechanism 570F and, for example, the openings or bores 156A, 156B of a block 150). Optionally, the one or more levers 575F are resiliently coupled to the linear post 571F2. For example, one or more resilient members 576 (e.g., bumpers made of resilient material, such as rubber) can be disposed about the pivoting axis of the one or more levers 575F (e.g., pivoting axis through the coupling location of the distal end 575F1 to the linear post 571F2). The one or more levers 575F (e.g., plurality of levers) can move independently of each other. Optionally, the body 575F3 of the one or more levers 575F is linear. Optionally, the body 575F3 of the lever(s) 575F are sized to be at least partially received in a linear recess 571F3 of the linear post 571F2 (e.g., to make the damped self-centering mechanism 570F more compact). Optionally, the one or more levers 575F extend at an angle (e.g., acute angle) relative to an axis (e.g., central axis, axis of symmetry) of the linear post 571F2. In one implementation, all of the one or more levers 575F extend at substantially the same angle (e.g., acute angles) relative to the support structure 571F. In another implementation, two or more of the one or more levers 575F extend at different angles (e.g., acute angles) relative to the support structure 571F. For example, the distal end 575F1 of the lever(s) 575F is radially closer to the linear post 571F2 and the proximal end 575F2 of the lever(s) 575F is radially farther from the linear post 571F2.

FIGS. 8C-8H show the damped self-centering mechanism 570F (e.g., attached to a distal end of the grabber 500) as it moves into and through a bore or opening 156A, 156B (e.g., in a block 150). As shown, each of the levers 575F can move independently of each other upon contacting an inner surface of the bore or opening 156A, 156B. The damped lever(s) 575F absorb (e.g., dampen) at least a portion of the contact force between the self-centering mechanism 570F and the surface of the bore or opening 156A, 156B to facilitate movement of the self-centering mechanism 570F (e.g., and therefore the arm(s) 540 of the grabber 500) toward a center of the opening or bore 156A, 156B (e.g., while reducing a reaction force from the contact between the self-centering mechanism 570F and the opening or bore 156A, 156B) as the self-centering mechanism 570F (e.g., and therefore the arm(s) 540 of the grabber 500) moves through the opening or bore 156A, 156B (e.g., of the block 150).

Figure 9:
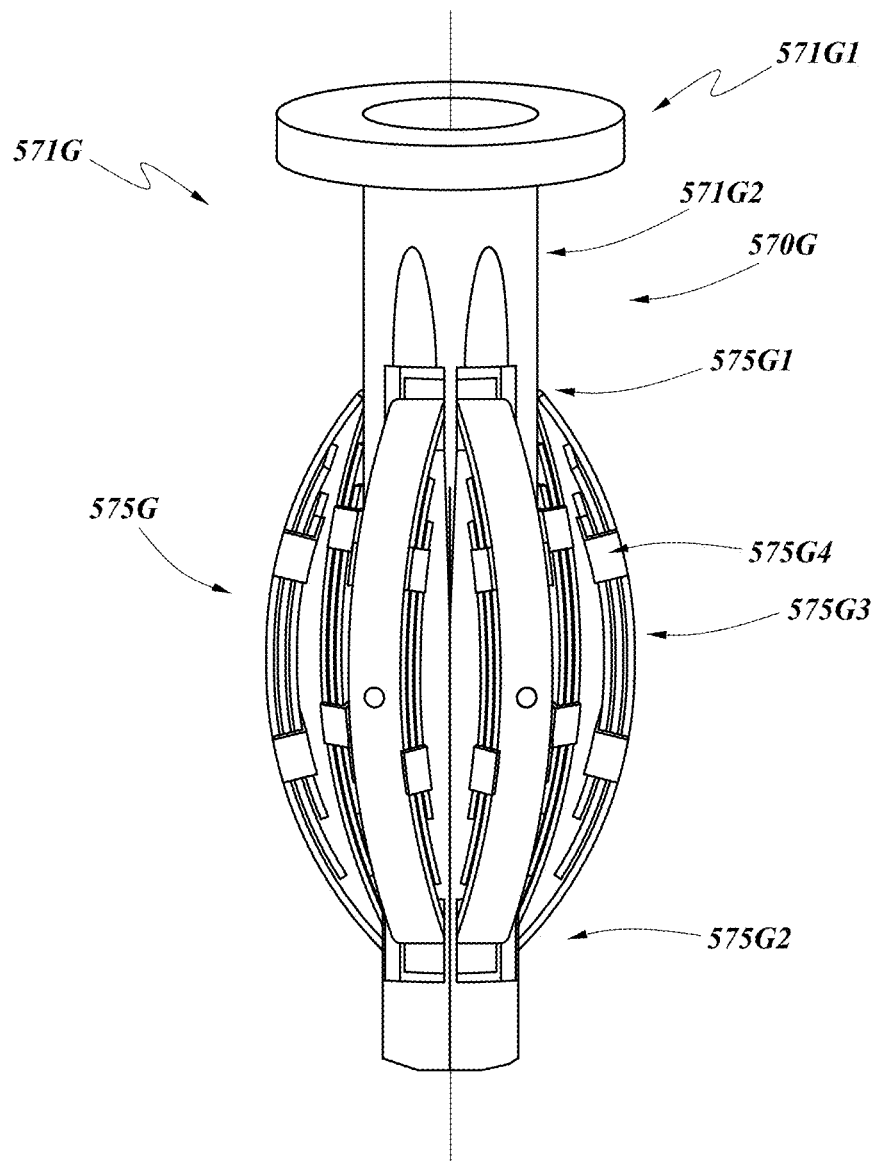
FIG. 9 is a perspective view of another embodiment of a damped self-centering mechanism.
Figure 9A:
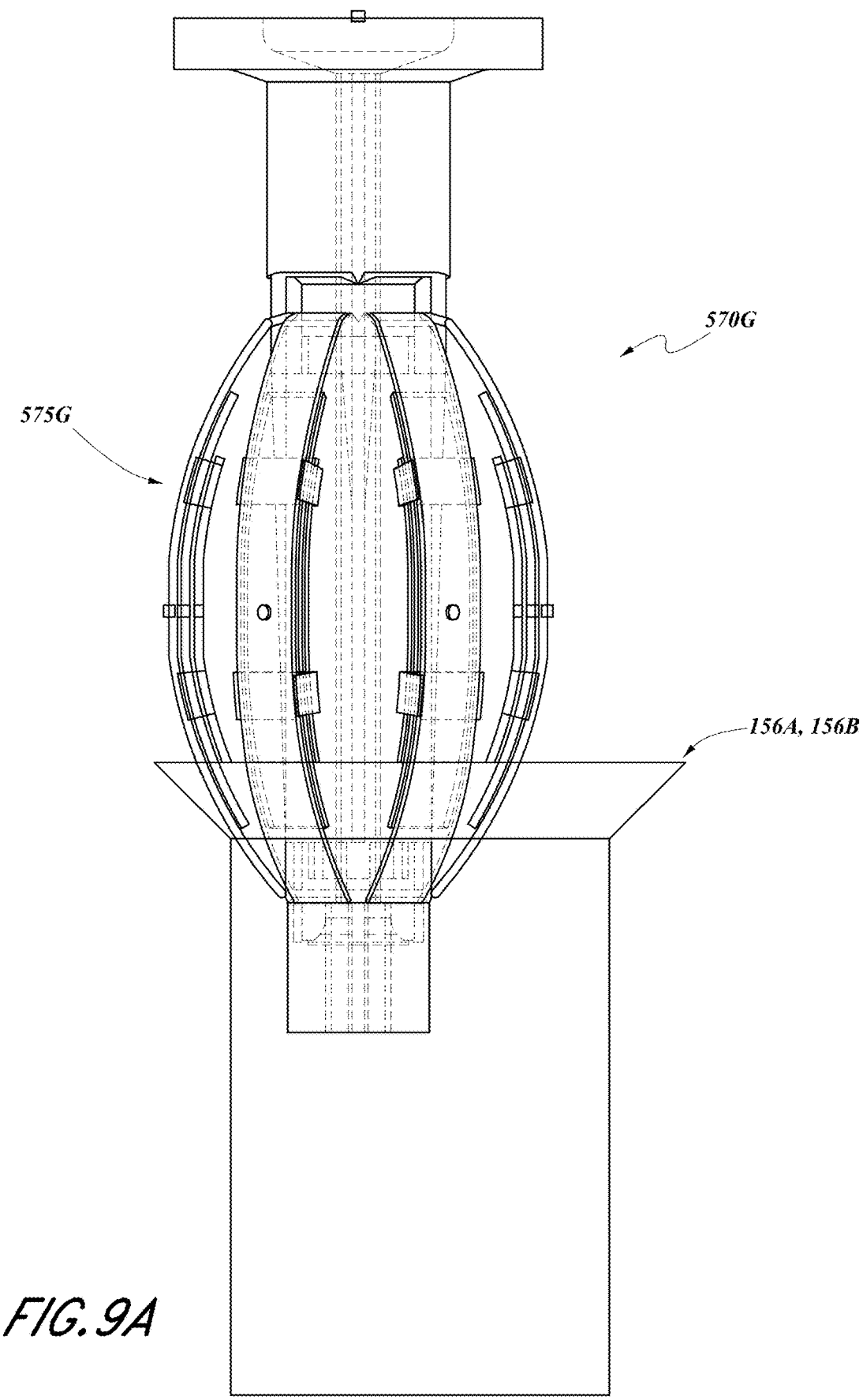
FIG. 9A is another perspective view of the damped self-centering mechanism in FIG. 9 in one position relative to an opening in a block.
Figure 9B:
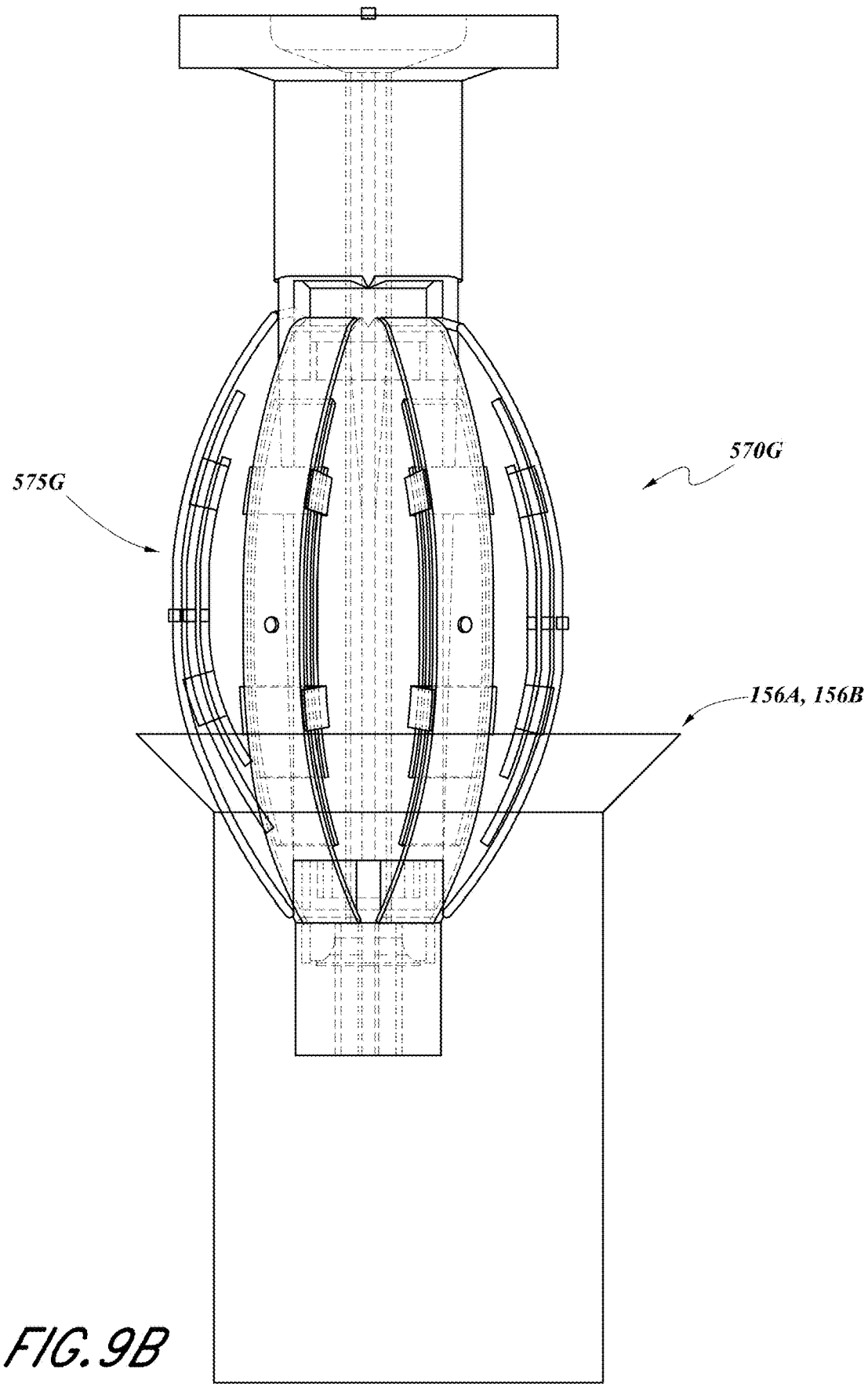
FIG. 9B is another perspective view of the damped self-centering mechanism in FIG. 9 in another position relative to an opening in a block.
Figure 9C:
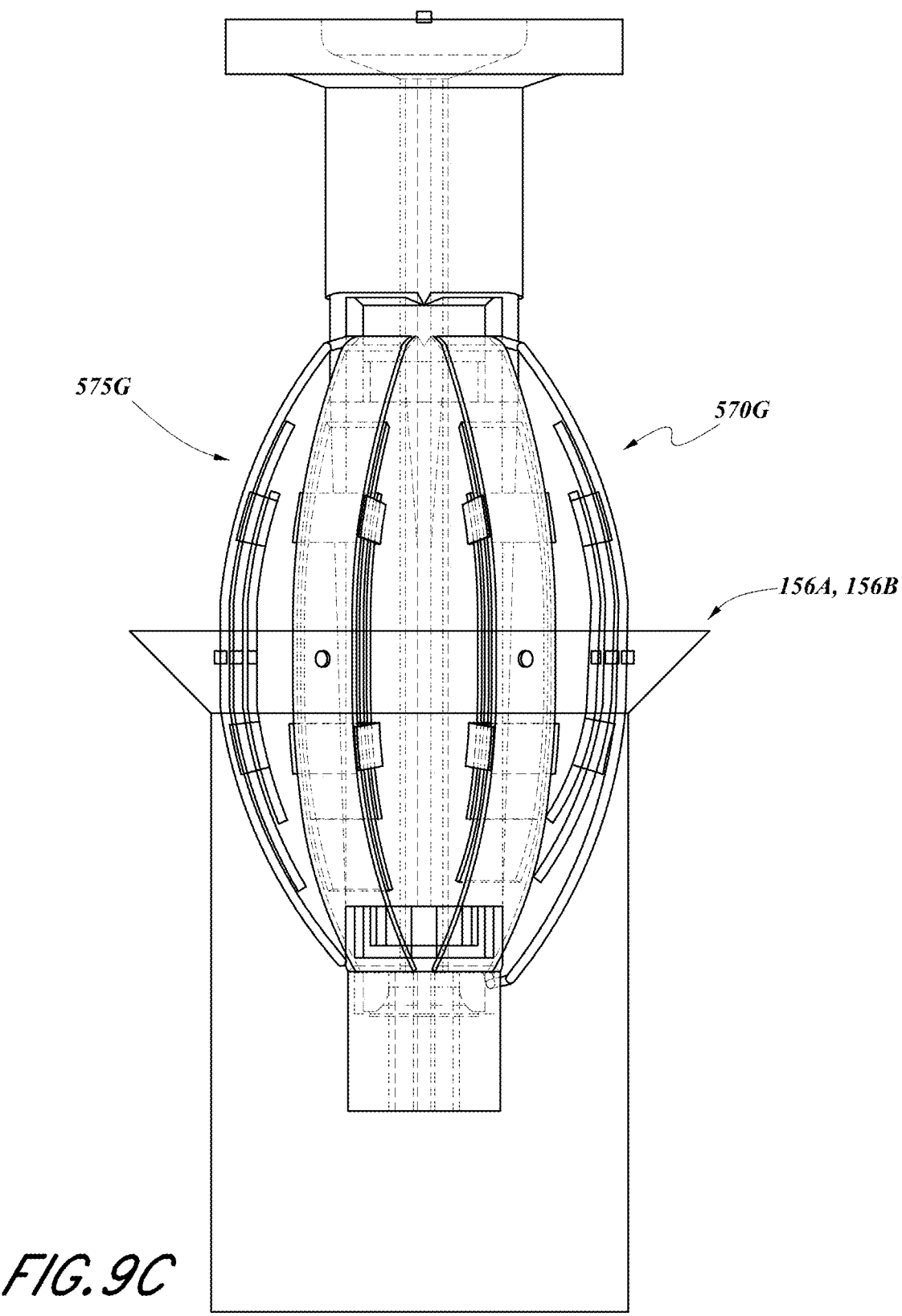
FIG. 9C is another perspective view of the damped self-centering mechanism in FIG. 9 in another position relative to an opening in a block.
Figure 9D:
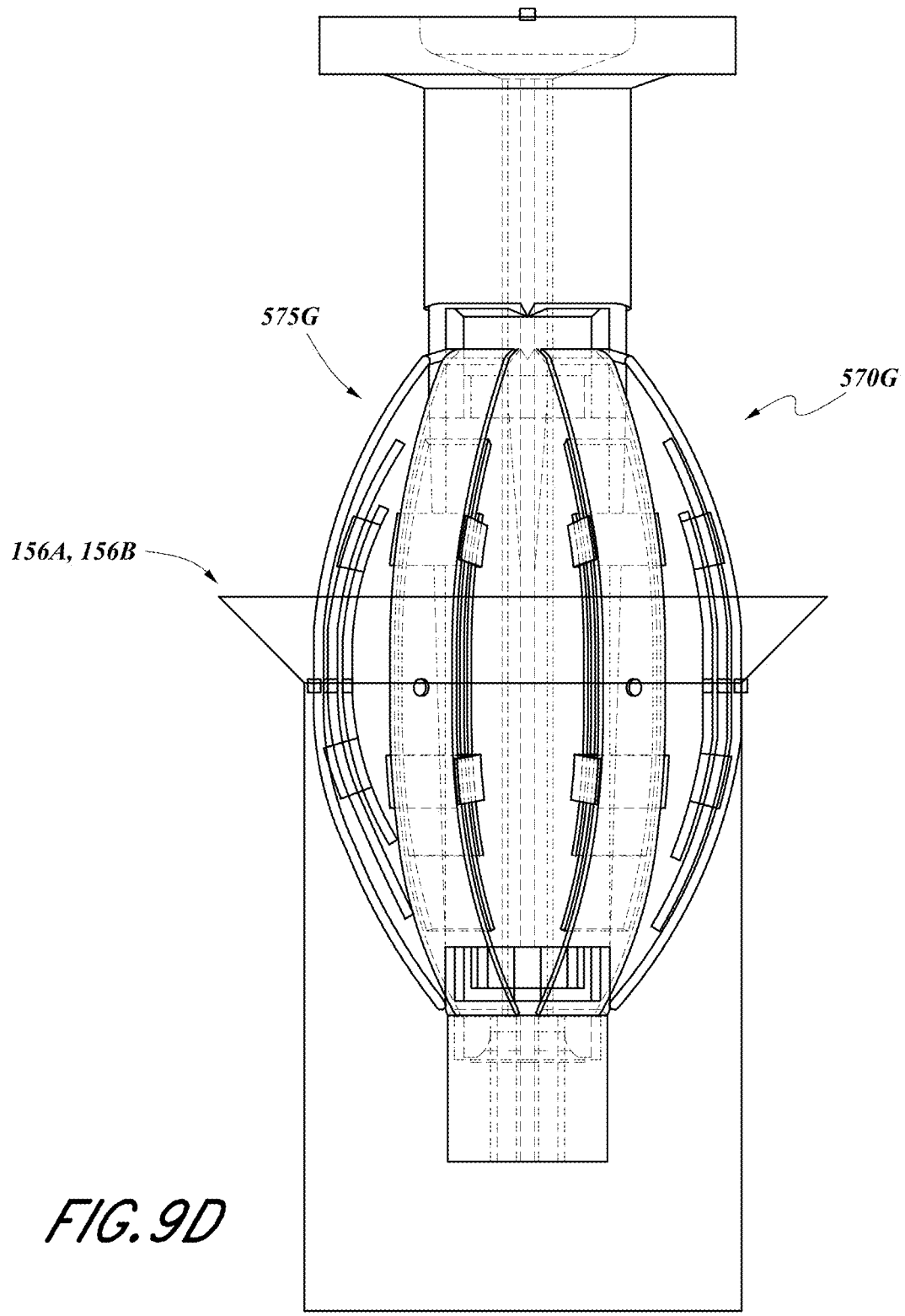
FIG. 9D is another perspective view of the damped self-centering mechanism in FIG. 9 in another position relative to an opening in a block.
Figure 9E:
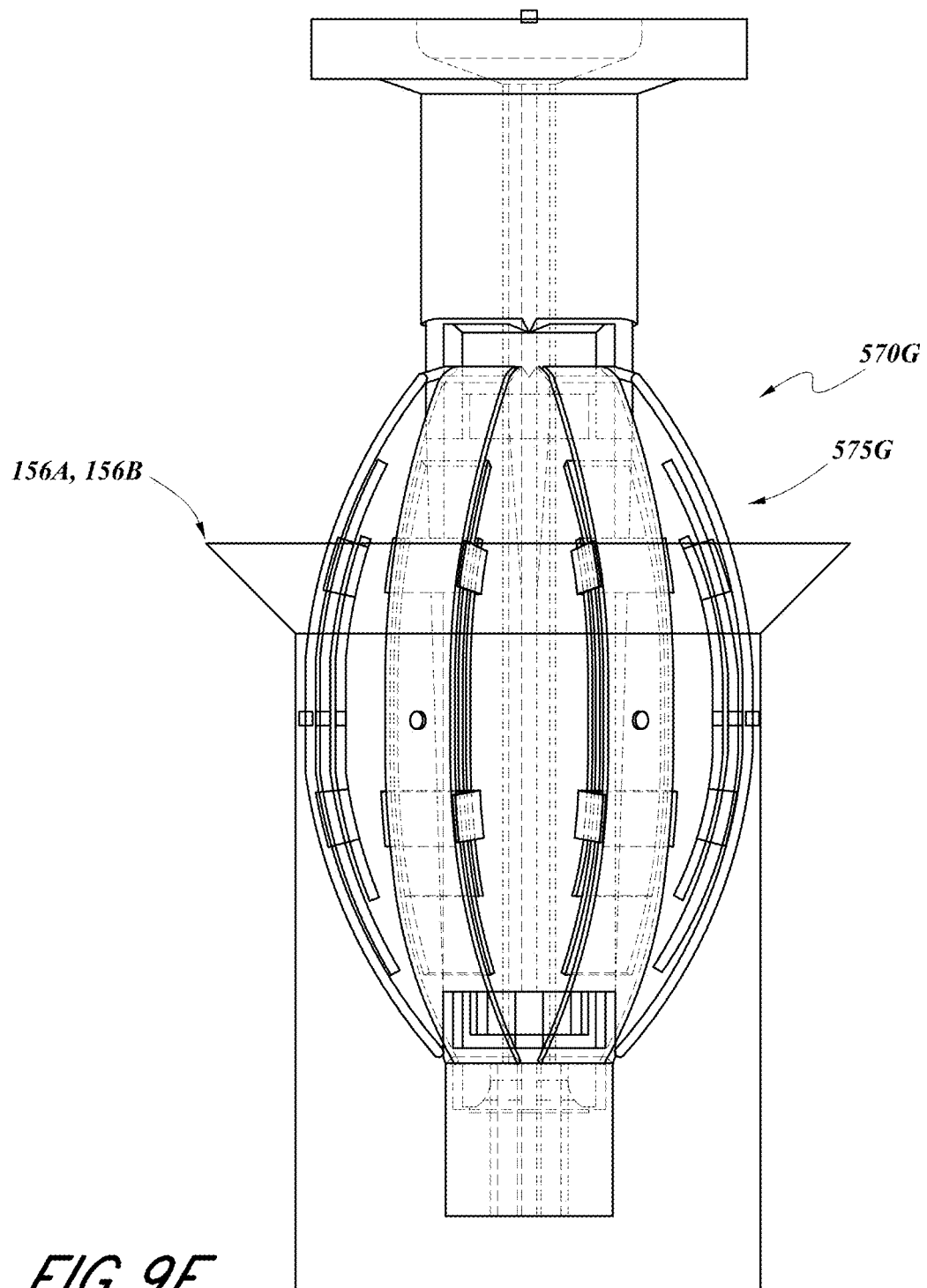
FIG. 9E is another perspective view of the damped self-centering mechanism in FIG. 9 in another position relative to an opening in a block.
Figure 9F:
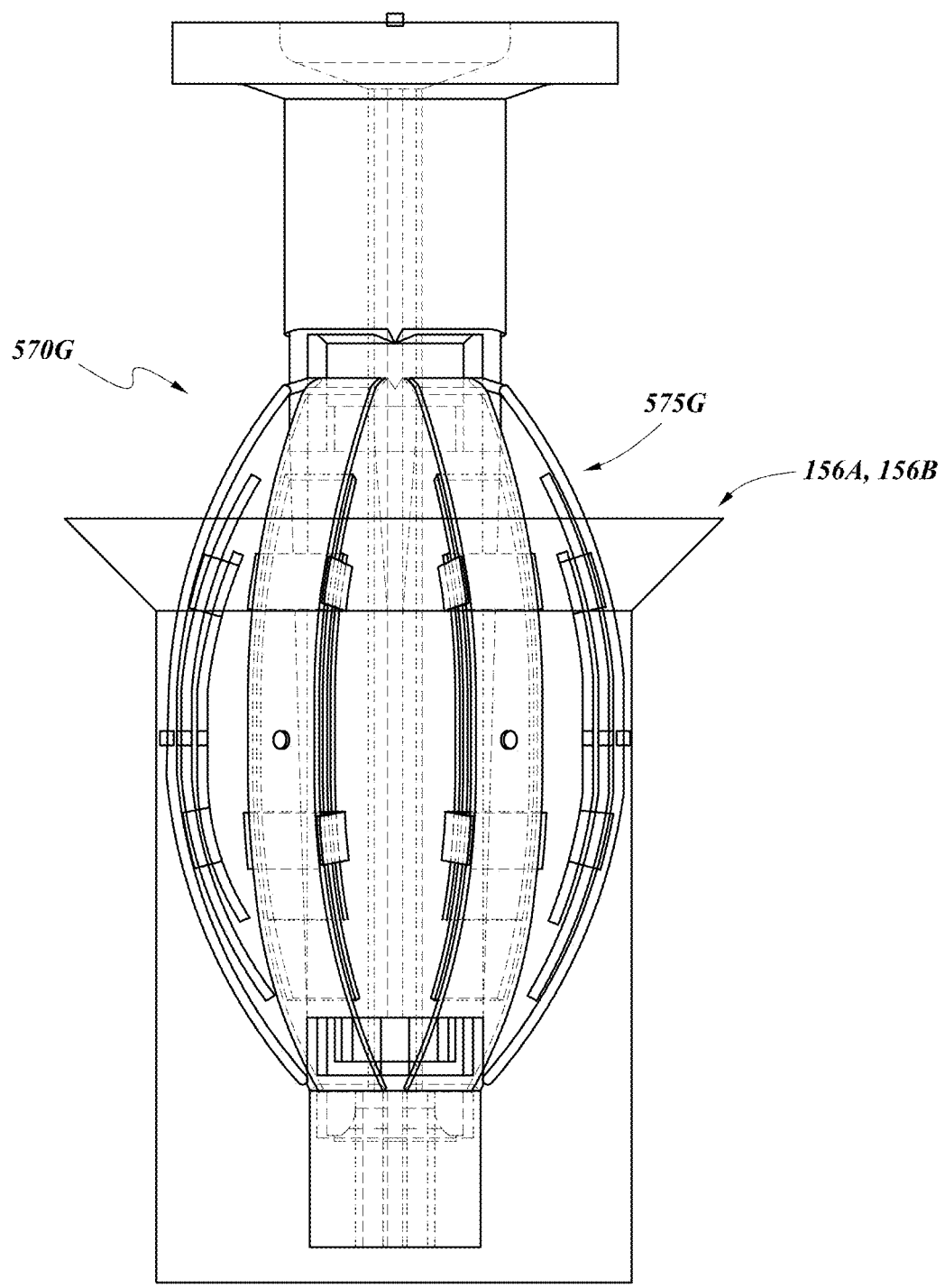
FIG. 9F is another perspective view of the damped self-centering mechanism in FIG. 9 in another position relative to an opening in a block.
Figure 9G:
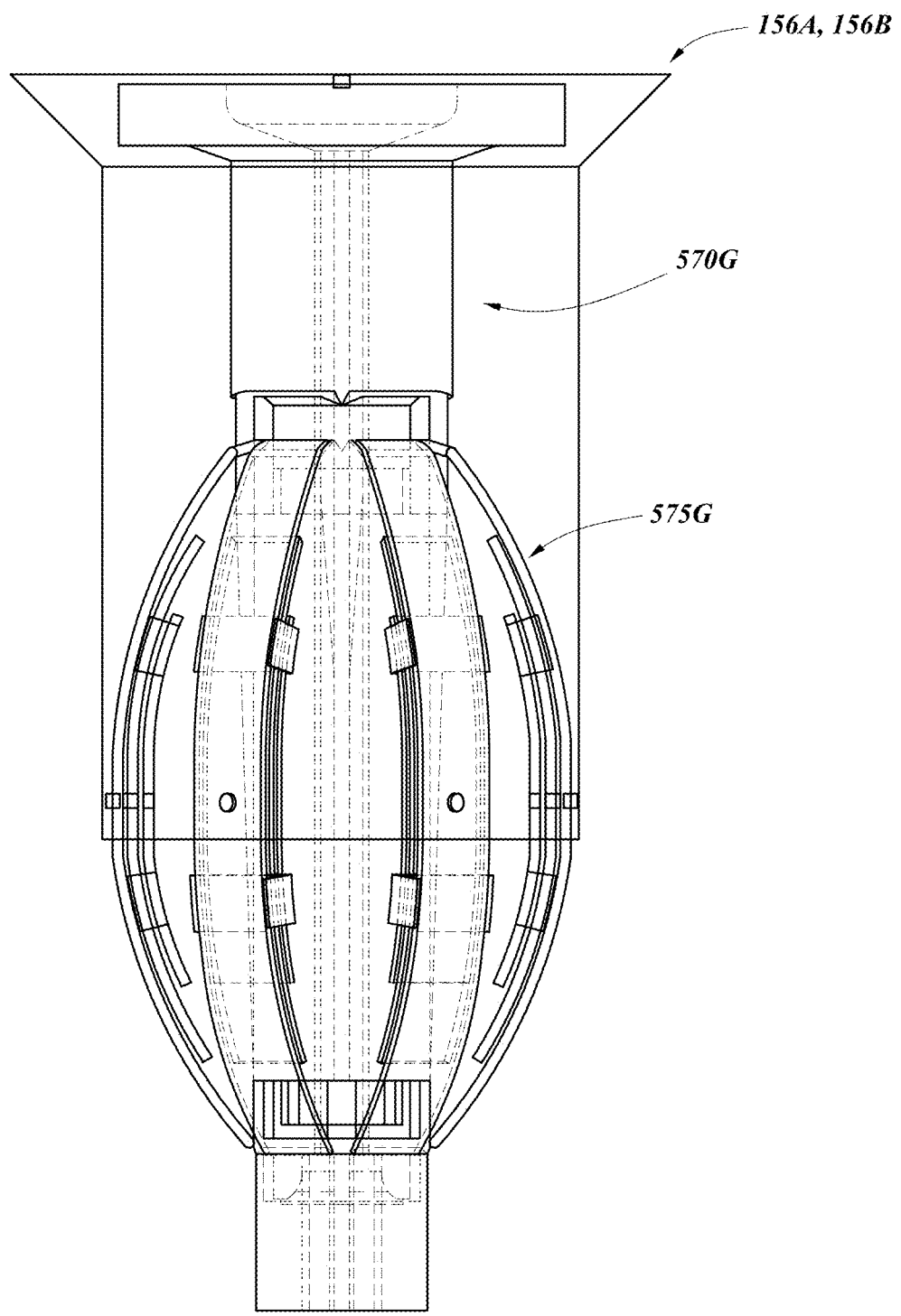
FIG. 9G is another perspective view of the damped self-centering mechanism in FIG. 9 in another position relative to an opening in a block.

FIGS. 9-9G show a damped self-centering mechanism 570G with one or more (e.g., a plurality of) damped leaf springs 575G. The one or more leaf springs 575G can be arranged about the circumference of a support structure or member 571G (e.g., plurality of springs 575G spaced apart from each other circumferentially about the support structure 571G). The support structure 571G can have a flange 571G1 (e.g., circular flange or disc) and a linear post 571G2 that extends distally from the flange 571G1. The one or more springs 575G can extend between a proximal end 575G1 and a distal end 575G2. The proximal end 575G1 and the distal end 575G2 can be movably coupled (e.g., pivotally coupled, such as about axles) to the support structure 571G (e.g., pivotally coupled to the linear post 571G2), and the body 575G3 can be curved and bulge or protrude outward relative to the linear post 571G2. Each of the one or more leaf springs 575G can include a plurality of stacked leaf springs 575G, which can be coupled together by one or more clamps 575G4. The one or more leaf springs 575G can flex and/or deflect (e.g., inward toward the linear post 571G2) when they contact the inner surface of the openings 156A, 156B (e.g., to absorb at least a portion of the contact force between the self-centering mechanism 570G and, for example, the openings or bores 156A, 156B). Optionally, the one or more springs 575G are curved and define a convex outer surface relative to the linear post 571G2. Optionally, the one or more leaf springs 575G define a generally convex, ovoid and/or ball shape that protrudes outward from the linear post 571G2. Advantageously, the generally convex, ovoid and/or ball shape of the leaf spring(s) 575G facilitates movement (e.g., insertion) of the damped self-centering mechanism 570G, and therefore the arm(s) 540 of the grabber 500, relative to surfaces (e.g., the openings 156A, 156B) of the block 150. For example, the surface(s) (e.g., the surfaces or edges of the openings 156A, 156B) of the block 150 can move (e.g., slide) along the convex, ovoid and/or ball shape of the leaf spring(s) 575G (see e.g. FIGS. 9A-9B). The damped leaf springs 575G can deflect independently of each other, depending on which comes in contact with the inner surface of the openings 156A, 156B in the block 150.

FIGS. 9A-9G show how the damped self-centering mechanism 570G (e.g., attached to a distal end of the grabber 500) as it moves into and through a bore or opening 156A, 156B (e.g., in a block 150). As shown, each of the leaf springs 575G can move or deflect independently of each other upon contacting an inner surface of the bore or opening 156A, 156B. The damped leaf spring(s) 575G absorb (e.g., dampen) at least a portion of the contact force between the self-centering mechanism 570G and the surface of the bore or opening 156A, 156B to facilitate movement of the self-centering mechanism 570G (e.g., and therefore the arm(s) 540 of the grabber 500) toward a center of the opening or bore 156A, 156B (e.g., while reducing a reaction force from the contact between the self-centering mechanism 570G and the opening or bore 156A, 156B) as the self-centering mechanism 570G (e.g., and therefore the arm(s) 540 of the grabber 500) moves through the opening or bore 156A, 156B (e.g., of the block 150).

Figure 10:
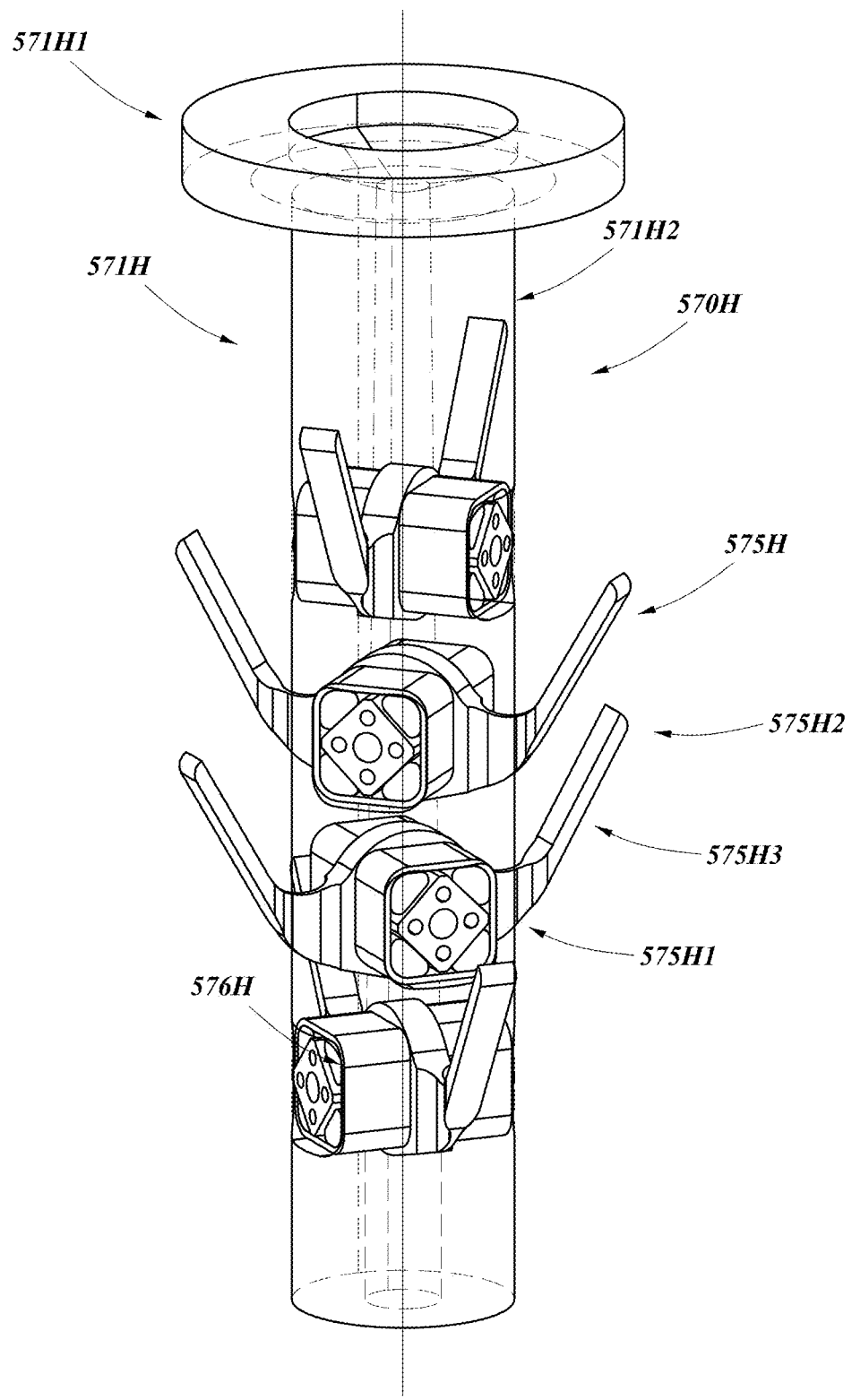
FIG. 10 is a perspective view of another embodiment of a damped self-centering mechanism.

FIG. 10 shows another damped self-centering mechanism 570H having multiple damped levers 575H about the circumference of a shaft. The levers 575H are arranged about the circumference of a support structure or member 571H (e.g., plurality of levers 575H spaced apart from each other circumferentially about the support structure 571H and/or spaced apart from each other linearly along length of support structure 571H). The 575H can be resiliently coupled to the support structure 571H (e.g., pivotally coupled to a linear post 571H2 of the support structure 571H at the distal end of the lever 575H). The support structure 571H can have a flange (e.g., circular flange or disc) 571H1, the linear post 571H2 extending distally from the flange 571H1. The levers 575H can extend between a distal (e.g., pivotally coupled) end 575H1 and a proximal (e.g., free) end 575H2. The body 575H3 of the lever(s) 575H can move (e.g., pivot about the distal end 575H1), for example, when contacted by a surface, such as the inner surface of the openings or bores 156A, 156B (e.g., to absorb at least a portion of the contact force between the self-centering mechanism 570H and, for example, the openings or bores 156A, 156B of a block 150). Optionally, the one or more levers 575H are resiliently coupled to the linear post 571H2. For example, one or more resilient members 576H (e.g., bumpers made of resilient material, such as rubber) can be disposed about the pivoting axis of the one or more levers 575H (e.g., pivoting axis through the coupling location of the distal end 575H1 to the linear post 571H2). The levers 575H (e.g., plurality of levers) can include one or more pairs of levers 575H extending from opposite sides of the linear post 571H2 and about the same resilient member 576H, each pair of levers 575H being a single (e.g., unitary piece), so that movement of one lever in a pair of levers 575H also moves the other of the pair of levers 575H (e.g., in an opposite direction and by the same amount). Optionally, the body 575H3 of each of the levers 575H is linear. Optionally, the one or more levers 575H extend at an angle (e.g., acute angle) relative to an axis (e.g., central axis, axis of symmetry) of the linear post 571H2. In one implementation, all of the one or more levers 575H extend at substantially the same angle (e.g., acute angles) relative to the support structure 571H. In another implementation, two or more of the one or more levers 575H extend at different angles (e.g., acute angles) relative to the support structure 571H. For example, the distal end 575H1 of the lever(s) 575H is radially closer to the linear post 571H2 and the proximal end 575H2 of the lever(s) 575H is radially farther from the linear post 571H2. In another implementation, the damped levers 575H can deflect or move independently of each other, depending on which comes in contact with the inner surface of the openings 156A, 156B in the block 150.

In the self-centering mechanisms 570A-570G described above, the damping can be provided by one or more of a deflection of a spring element, a compression of a resilient member (e.g., made of rubber) attached to an end of the springs or levers 575A-575G. However, the damping can be provided by a pneumatic or hydraulic component associated with the springs or levers 575A-575G.

Additional Embodiments

In embodiments of the present invention, a damped self-centering mechanism, and method of operating the same, may be in accordance with any of the following clauses:

Clause 1: A grabber for use in lifting and lowering blocks, comprising:
one or more arms extending from a proximal end toward a distal end, and
a damped self-centering mechanism at a distal portion of the one or more arms configured to dampen a contact force received thereon and to facilitate a self-centering of the damped self-centering mechanism relative to a surface of a block when the grabber is moved relative to the block.

Clause 2: The grabber of any preceding clause, wherein the one or more arms are a pair of arms, the distal portion of each arm including the damped self-centering mechanism.

Clause 3: The grabber of any preceding clause, further comprising one or more levers located in the distal portion of the one or more arms, the one or more levers actuatable between a retracted position that allows the grabber to be lowered past a bottom end of the block and an extended position that allows the one or more levers to engage the block, the damped self-centering mechanism configured to extend past a bottom surface of the block when the grabber is coupled to the block.

Clause 4: The grabber of any preceding clause, wherein the one or more levers are a plurality of levers arranged circumferentially about the distal portion of each of the arms.

Clause 5: The grabber of any preceding clause, wherein each of the pair of arms is tubular.

Clause 6: The grabber of any preceding clause, wherein in the retracted position the one or more levers are oriented parallel to a central axis of the arms.

Clause 7: The grabber of any preceding clause, wherein the damped self-centering mechanism comprises a plurality of leaf springs coupled at a proximal end and a distal end thereof to a support member, the plurality of leaf springs arranged circumferentially about the support member and configured to at least partially deflect to dampen the contact force.

Clause 8: The grabber of any preceding clause, wherein the plurality of leaf springs comprise a linear body between the proximal end and the distal end thereof.

Clause 9: The grabber of any preceding clause, wherein the plurality of leaf springs at least partially define a conical shape.

Clause 10: The grabber of any preceding clause, wherein the plurality of leaf springs comprise a curved body between the proximal end and the distal end thereof.

Clause 11: The grabber of any preceding clause, wherein the plurality of leaf springs at least partially define an convex shape.

Clause 12: The grabber of any preceding clause, wherein the damped self-centering mechanism comprises a plurality of cantilevered springs coupled at a distal end thereof to a support member, the plurality of cantilevered springs arranged circumferentially about the support member and configured to at least partially deflect to dampen the contact force.

Clause 13: The grabber of any preceding clause, wherein the plurality of cantilevered springs are angled relative to an axis of the support member.

Clause 14: The grabber of any preceding clause, wherein the damped self-centering mechanism comprises a plurality of damped levers pivotally coupled at a distal end thereof to a support member, the plurality of damped levers arranged circumferentially about the support member and configured to at least partially move to dampen the contact force.

Clause 15: The grabber of any preceding clause, wherein the damped levers are arranged at different longitudinal positions on the support member.

Clause 16: The grabber of any preceding clause, wherein the damped levers are resiliently coupled to the support member via a resilient member.

Clause 17: The grabber of any preceding clause, wherein the damped levers are independently pivotable relative to the support member.

Clause 18: A grabber for use in lifting and lowering blocks, comprising:
one or more arms extending from a proximal end toward a distal end, and
damped means for self-centering a distal portion of the one or more arms and for dampening a contact force received thereon from a surface of a block.

Clause 19: The grabber of clause 18, wherein the damped means comprises one or more leaf springs, cantilevered springs or damped levers.

Clause 20: The grabber of any of clauses 18 and 19, wherein the one or more arms are a pair of arms, each arm including the damped means.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A grabber for use in lifting and lowering blocks, comprising:
   one or more arms extending from a proximal end toward a distal end, and
   a damped self-centering mechanism at a distal portion of the one or more arms configured to dampen a contact force received thereon and to facilitate a self-centering of the damped self-centering mechanism relative to a surface of a block when the grabber is moved relative to the block:,
   wherein the damped self-centering mechanism comprises a plurality of leaf springs coupled at a proximal end and at a distal end thereof to a support member of a fixed length, the plurality of leaf springs arranged circumferentially about the support member and configured to at least partially deflect to dampen the contact force.

2. The grabber of claim 1, wherein the one or more arms are a pair of arms, the distal portion of each arm including the damped self-centering mechanism.

3. The grabber of claim 1, further comprising one or more levers located in the distal portion of the one or more arms, the one or more levers actuatable between a retracted position that allows the grabber to be lowered past a bottom end of the block and an extended position that allows the one or more levers to engage the block, the damped self-centering mechanism configured to extend past a bottom surface of the block when the grabber is coupled to the block.

4. The grabber of claim 3, wherein the one or more levers are a plurality of levers arranged circumferentially about the distal portion of each of the one or more arms.

5. The grabber of claim 3, wherein in the retracted position the one or more levers are oriented parallel to a central axis of the arms.

6. The grabber of claim 1, wherein the one or more arms is tubular.

7. The grabber of claim 1, wherein the plurality of leaf springs comprise a linear body between the proximal end and the distal end thereof.

8. The grabber of claim 1, wherein the plurality of leaf springs comprise a curved body between the proximal end and the distal end thereof.

9. The grabber of claim 8, wherein the plurality of leaf springs at least partially define an convex shape.

10. The grabber of claim 1, wherein the plurality of leaf springs are a plurality of stacked leaf springs.

11. The grabber of claim 10, wherein the plurality of stacked leaf springs are coupled together by one or more clamps.

12. The grabber of claim 1, wherein the plurality of leaf springs deflect independently of each other.

13. A grabber for use in lifting and lowering blocks, comprising:
one or more arms extending from a proximal end toward a distal end, and
damped means for self-centering a distal portion of the one or more arms and for dampening a contact force received thereon from a surface of a block:,
wherein the damped means comprises a plurality of stacked leaf springs coupled at a proximal end and at a distal end thereof to a support member, the plurality of stacked leaf springs at least partially defining a convex shape and configured to at least partially deflect to dampen the contact force.

14. The grabber of claim 13, wherein the plurality of stacked leaf springs are coupled together by one or more clamps.

15. The grabber of claim 13, wherein the one or more arms are a pair of arms, each arm including the damped means.

* * * * *

UNITED STATES PATENT AND TRADEMARK OFFICE
CERTIFICATE OF CORRECTION

PATENT NO. : 11,820,629 B2
APPLICATION NO. : 17/153241
DATED : November 21, 2023
INVENTOR(S) : Andrea Pedretti It is certified that error appears in the above-identified patent and that said Letters Patent is hereby corrected as shown below:

In the Claims

Column 12, Line 49, Claim 1, delete "block:," and insert -- block; --.

Column 14, Line 9, Claim 13, delete "block:," and insert -- block; --.

Signed and Sealed this
Sixteenth Day of April, 2024

Katherine Kelly Vidal
*Director of the United States Patent and Trademark Office*